US006652959B2

(12) United States Patent
Foucher et al.

(10) Patent No.: US 6,652,959 B2
(45) Date of Patent: Nov. 25, 2003

(54) MARKING PARTICLES

(75) Inventors: Daniel A. Foucher, Rochester, NY (US); Raj D. Patel, Oakville (CA); Naveen Chopra, Oakville (CA); Peter M. Kazmaier, Mississauga (CA)

(73) Assignee: Xerox Corporation, Stamford, CT (US)

(*) Notice: Subject to any disclaimer, the term of this patent is extended or adjusted under 35 U.S.C. 154(b) by 126 days.

(21) Appl. No.: 10/042,341

(22) Filed: Jan. 11, 2002

(65) Prior Publication Data

US 2002/0187414 A1 Dec. 12, 2002

Related U.S. Application Data

(62) Division of application No. 09/864,535, filed on May 24, 2001, now Pat. No. 6,358,655.

(51) Int. Cl.[7] .......................... B32B 5/16; G06K 19/06; C09D 5/26

(52) U.S. Cl. ....................... 428/327; 428/323; 428/402; 428/402.24; 430/108.21; 430/108.22; 430/120; 430/108.1; 430/137.14; 106/31.17; 106/31.64; 106/31.65; 106/31.75; 106/31.76; 106/31.78; 235/487; 235/494; 345/107; 345/106

(58) Field of Search ................................ 428/323, 327, 428/402, 402.24; 430/108.21, 108.22, 120, 108.1, 137.14; 106/31.17, 31.64, 31.65, 31.75, 31.76, 31.78; 235/487, 494; 345/107, 106

(56) References Cited

U.S. PATENT DOCUMENTS

| | | | | |
|---|---|---|---|---|
| 4,028,118 A | * 6/1977 | Nakasuji et al. | 106/31.19 |
| 4,421,560 A | * 12/1983 | Kito et al. | 106/31.2 |
| 5,051,779 A | 9/1991 | Hikawa | 355/200 |
| 5,091,966 A | 2/1992 | Bloomberg et al. | 382/21 |
| 5,128,525 A | 7/1992 | Stearns et al. | 235/454 |
| 5,168,147 A | 12/1992 | Bloomberg | 235/456 |
| 5,278,020 A | 1/1994 | Grushkin et al. | 430/137 |
| 5,290,654 A | 3/1994 | Sacripante et al. | 430/137 |
| 5,291,243 A | 3/1994 | Heckman et al. | 355/201 |
| 5,308,734 A | 5/1994 | Sacripante et al. | 430/137 |
| 5,337,361 A | 8/1994 | Wang et al. | 380/51 |
| 5,344,738 A | 9/1994 | Kmiecik-Lawrynowicz et al. | 430/137 |
| 5,346,797 A | 9/1994 | Kmiecik-Lawrynowicz et al. | 430/137 |
| 5,348,832 A | 9/1994 | Sacripante et al. | 430/109 |
| 5,364,729 A | 11/1994 | Kmiecik-Lawrynowicz et al. | 430/137 |
| 5,366,841 A | 11/1994 | Patel et al. | 430/137 |
| 5,370,963 A | 12/1994 | Patel et al. | 430/137 |
| 5,376,172 A | 12/1994 | Tripp et al. | 106/490 |
| 5,403,693 A | 4/1995 | Patel et al. | 430/137 |
| 5,405,728 A | 4/1995 | Hopper et al. | 430/137 |
| 5,418,108 A | 5/1995 | Kmiecik-Lawrynowicz et al. | 430/137 |
| 5,496,676 A | 3/1996 | Croucher et al. | 430/137 |

(List continued on next page.)

FOREIGN PATENT DOCUMENTS

| | | | |
|---|---|---|---|
| EP | 459792 A2 | 12/1991 |
| EP | 469864 A2 | 2/1992 |

OTHER PUBLICATIONS

James T.C. Wojtyk, Peter M. Kazmaier and Erwin Buncel, Effects of Metal Ion Complexation on the Spiropyran–Merocyanine Interconversion: Development of a Thermally Stable Photo–Switch, Chem. Commun., 1998, p. 1703.

*Primary Examiner*—Vivian Chen
(74) *Attorney, Agent, or Firm*—Judith L. Byorick

(57) ABSTRACT

Disclosed are marking particles comprising a resin, a chelating agent, and a spiropyran material which is of the formula

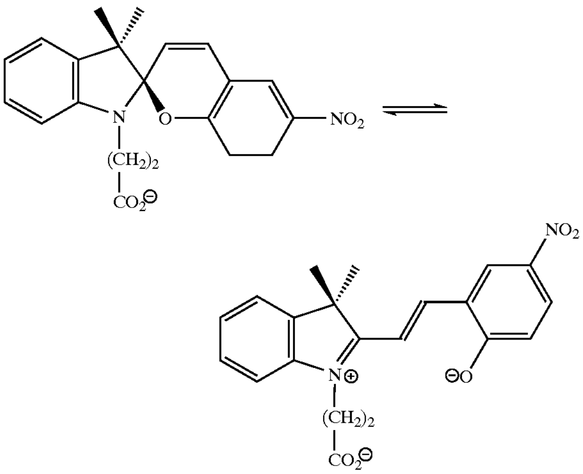

or

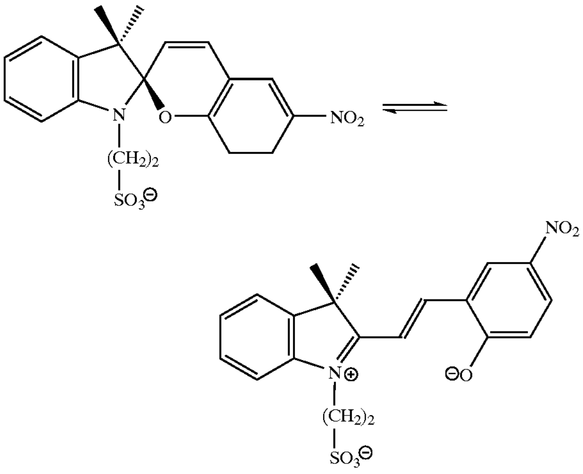

The marking particles are prepared by an emulsion aggregation process.

26 Claims, No Drawings

U.S. PATENT DOCUMENTS

| | | | | | |
|---|---|---|---|---|---|
| 5,501,935 | A | | 3/1996 | Patel et al. | 430/137 |
| 5,527,658 | A | | 6/1996 | Hopper et al. | 430/137 |
| 5,551,973 | A | | 9/1996 | Oliver et al. | 106/22 B |
| 5,585,215 | A | | 12/1996 | Ong et al. | 430/107 |
| 5,593,486 | A | | 1/1997 | Oliver et al. | 106/22 A |
| 5,633,109 | A | | 5/1997 | Jennings et al. | 430/115 |
| 5,650,255 | A | | 7/1997 | Ng et al. | 430/137 |
| 5,650,256 | A | | 7/1997 | Veregin et al. | 430/137 |
| 5,710,420 | A | | 1/1998 | Martin et al. | 235/487 |
| 5,759,729 | A | | 6/1998 | Martin et al. | 430/106 |
| 5,922,501 | A | | 7/1999 | Cheng et al. | 430/137 |
| 6,107,010 | A | * | 8/2000 | Corniglion et al. | 430/333 |
| 6,132,924 | A | | 10/2000 | Patel et al. | 430/137 |
| 6,214,500 | B1 | * | 4/2001 | Kumacheva et al. | 430/21 |
| 6,358,655 | B1 | * | 3/2002 | Foucher et al. | 430/108.21 |
| 6,365,312 | B1 | * | 4/2002 | Foucher et al. | 430/108.21 |
| 6,458,165 | B1 | * | 10/2002 | Foucher et al. | 359/296 |
| 6,517,618 | B2 | * | 2/2003 | Foucher et al. | 106/31.16 |
| 6,525,136 | B1 | * | 2/2003 | Foucher et al. | 525/88 |
| 2003/0002132 | A1 | * | 1/2003 | Foucher et al. | 359/296 |

* cited by examiner

MARKING PARTICLES

This application is a divisional of application Ser. No. 09/864,535, filed May 24, 2001, U.S. Pat. No. 6,358,655.

Application U.S. Ser. No. 09/864,3 86, filed concurrently herewith, entitled. "Photochromic Gyricon Display," with the named inventors Daniel A. Foucher, Raj D. Patel, Naveen Chopra, Peter M. Kazmaier, Erwin Buncel, and James Wojtyk, the disclosure of which is totally incorporated herein by reference, discloses a display comprising an arrangement of a plurality of optically anisotropic rotatable elements, each of said rotatable elements having a surface in contact with an enabling fluid, said rotatable elements being electrically dipolar in the presence of the enabling fluid and thus being subject to rotation upon application of an electric field, said rotatable elements being free to rotate in place but not free to translate substantially so as to disrupt the arrangement of rotatable elements, wherein a first portion of said surface contains a mixture of a chelating agent and a spiropyran material of the formula wherein n is an integer representing the number of repeat $—CH_2—$ units and R is —H or $—CH{=}CH_2$, and wherein a second portion of said surface contains substantially no spiropyran.

Application U.S. Ser. No. 09/864,902, filed concurrently herewith, entitled "Photochromic Electrophoretic Ink Display," with the named inventors Daniel A. Foucher, Raj D. Patel, Naveen Chopra, Peter M. Kazmaier, Erwin Buncel, and James Wojtyk, the disclosure of which is totally incorporated herein by reference, discloses an electrophoretic ink comprising a suspending fluid and, suspended in the suspending fluid, a plurality of particles comprising a mixture of a chelating agent and a spiropyran material of the formula

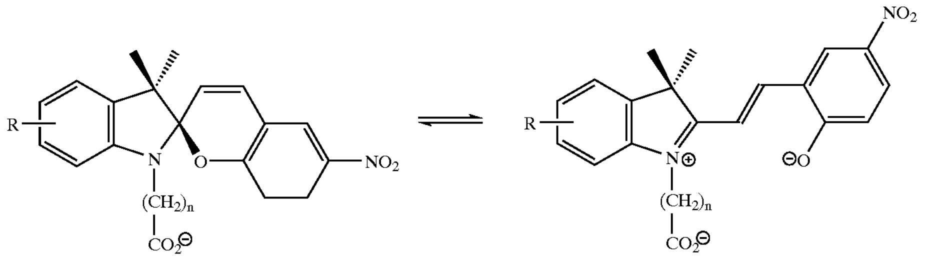

or

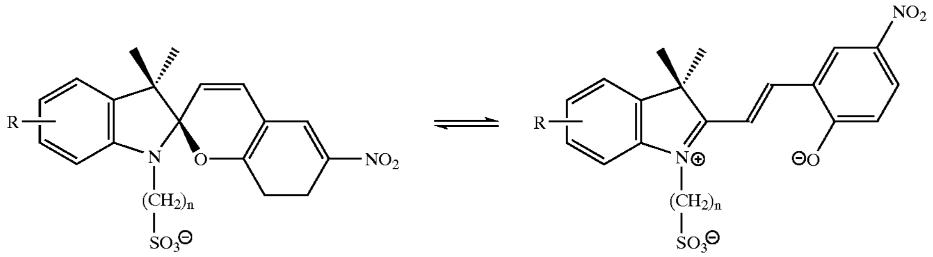

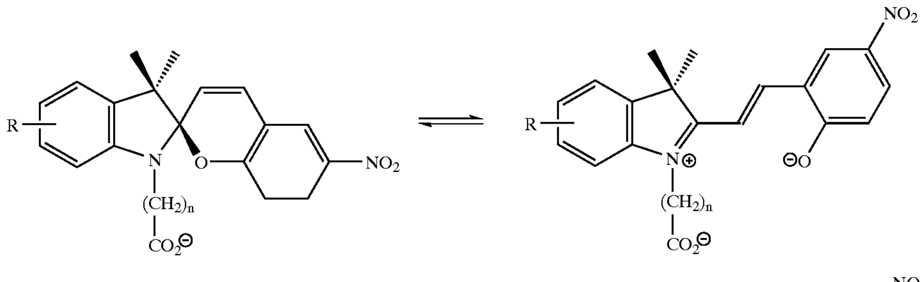

or

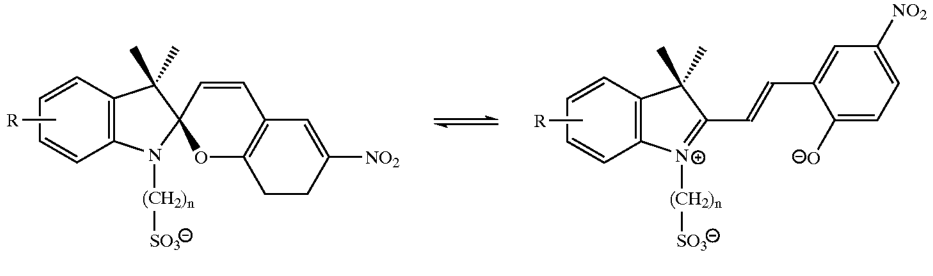

wherein n is an integer representing the number of repeat $—CH_2—$ unit and R is —H or $—CH{=}CH_2$, said particles being free to migrate within said suspending fluid under the influence of an electric field.

Application U.S. Ser. No. 09/864,475, filed concurrently herewith, entitled "Marking Particles," with the named inventors Daniel A. Foucher, Raj D. Patel, Naveen Chopra, Peter M. Kazmaier, Erwin Buncel, and James Wojtyk, the disclosure of which is totally incorporated herein by reference, discloses marking particles comprising a first polymer, a second polymer, a chelating agent, and a spiropyran material of the formula

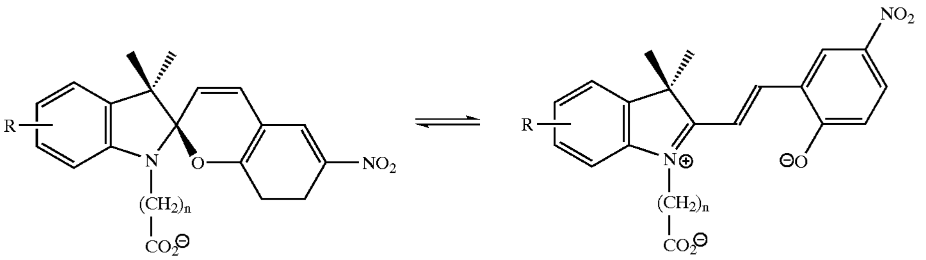

or

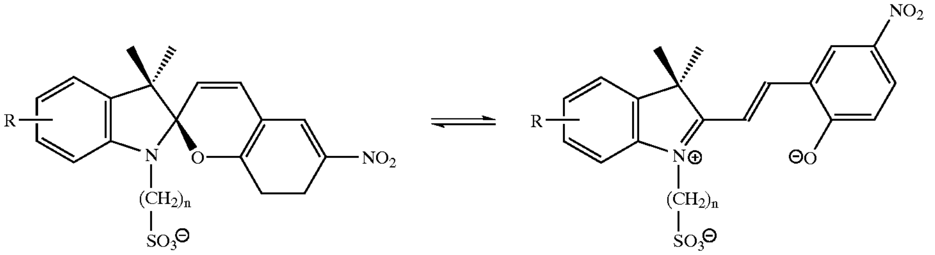

wherein n is an integer representing the number of repeat $—CH_2—$ units and R is —H or $—CH{=}CH_2$. The marking particles comprise a core containing the first polymer in which is dispersed the chelating agent and the spiropyran and encapsulated within a shell of the second polymer formulated by an interfacial polymerization.

BACKGROUND OF THE INVENTION

The present invention is directed to marking materials for generating images. More specifically, the present invention is directed to marking particles containing a photochromic spiropyran material. One embodiment of the present invention is directed to marking particles which comprise a resin, a chelating agent, and a spiropyran material which is of the formula

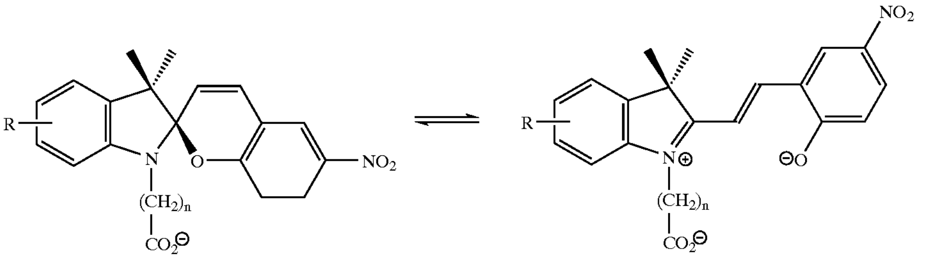

or

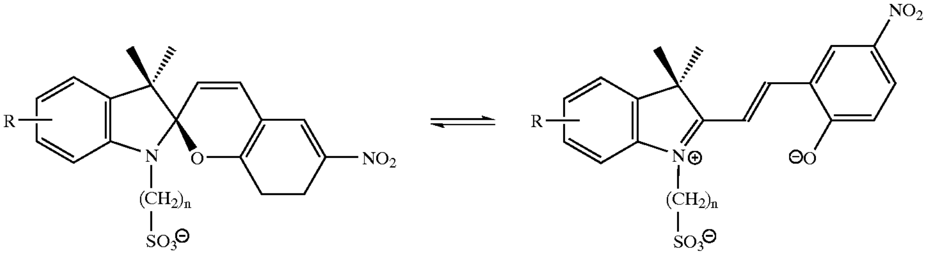

wherein n is an integer representing the number of repeat $—CH_2—$ units and R is —H or $—CH{=}CH_2$, wherein said particles are prepared by an emulsion aggregation process.

The formation and development of images on the surface of photoconductive materials by electrostatic means is well known. The basic electrophotographic imaging process, as taught by C. F. Carlson in U.S. Pat. No. 2,297,691, entails placing a uniform electrostatic charge on a photoconductive insulating layer known as a photoconductor or photoreceptor, exposing the photoreceptor to a light and shadow image to dissipate the charge on the areas of the photoreceptor exposed to the light, and developing the resulting electrostatic latent image by depositing on the image a finely divided electroscopic material known as toner. Toner typically comprises a resin and a colorant. The toner will normally be attracted to those areas of the photoreceptor which retain a charge, thereby forming a toner image corresponding to the electrostatic latent image. This developed image may then be transferred to a substrate such as paper. The transferred image may subsequently be permanently affixed to the substrate by heat, pressure, a combination of heat and pressure, or other suitable fixing means such as solvent or overcoating treatment.

Many methods are known for applying the electroscopic particles to the electrostatic latent image to be developed. One development method, disclosed in U.S. Pat. No. 2,618,552, the disclosure of which is totally incorporated herein by reference, is known as cascade development. Another technique for developing electrostatic images is the magnetic brush process, disclosed in U.S. Pat. No. 2,874,063. This method entails the carrying of a developer material containing toner and magnetic carrier particles by a magnet. The magnetic field of the magnet causes alignment of the magnetic carriers in a brushlike configuration, and this “magnetic brush” is brought into contact with the electrostatic image bearing surface of the photoreceptor. The toner particles are drawn from the brush to the electrostatic image by electrostatic attraction to the undischarged areas of the photoreceptor, and development of the image results. Other techniques, such as touchdown development, powder cloud development, and jumping development are known to be suitable for developing electrostatic latent images.

Photochromism in general is a reversible change of a single chemical species between two states having distinguishably different absorption spectra, wherein the change is induced in at least one direction by the action of electromagnetic radiation. The inducing radiation, as well as the changes in the absorption spectra, are usually in the ultraviolet, visible, or infrared regions. In some instances, the change in one direction is thermally induced. The single chemical species can be a molecule or an ion, and the reversible change in states may be a conversion between two molecules or ions, or the dissociation of a single molecule or ion into two or more species, with the reverse change being a recombination of the two or more species thus formed into the original molecule or ion. Photochromic phenomena are observed in both organic compounds, such as anils, disulfoxides, hydrazones, oxazones, semicarbazones, stilbene derivatives, o-nitrobenzyl derivatives, spiro compounds, and the like, and in inorganic compounds, such as metal oxides, alkaline earth metal sulfides, titanates, mercury compounds, copper compounds, minerals, transition metal compounds such as carbonyls, and the like. Photochromic materials are known in applications such as photochromic glasses, which are useful as, for example, ophthalmic lenses.

Methods for encoding machine-readable information on documents, packages, machine parts, and the like, are known. One-dimensional symbologies, such as those employed in bar codes, are known. Two-dimensional symbologies generally are of two types: matrix codes and stacked bar codes. Matrix codes typically consist of a random checker board of black and white squares. Alignment features such as borders, bullseyes, start and stop bits, and the like, are included in the matrix to orient the matrix during scanning. Stacked bar codes consist of several one-dimensional bar codes stacked together. Two-dimensional symbologies have an advantage over one-dimensional symbologies of enabling greater data density. For example, a typical bar code can contain from about 9 to about 20 characters per inch, while a typical two-dimensional symbology can contain from about 100 to about 800 characters per square inch. Many two-dimensional symbologies also utilize error correction codes to increase their robustness. Examples of two-dimensional symbologies include PDF417, developed by Symbol Technologies, Inc., Data Matrix, developed by International Data Matrix, Vericode, developed by Veritec, Inc., CP Code, developed by Teiryo, Inc. and Integrated Motions, Inc., Maxicode, developed by the United Parcel Service, Softstrip, developed by Softstrip, Inc., Code One, developed by Laserlight Systems, Supercode, developed by Metanetics Inc., DataGlyph, developed by Xerox Corporation, and the like. One-dimensional and two-dimensional symbologies can be read with laser scanners or with video cameras. The scanners typically consist of an imaging detector coupled to a microprocessor for decoding. Scanners can be packaged into pen-like pointing devices or guns. Bar-like codes and methods and apparatus for coding and decoding information contained therein are disclosed in, for example, U.S. Pat. No. 4,692,603, U.S. Pat. No. 4,665,004, U.S. Pat. No. 4,728,984, U.S. Pat. No. 4,728,783, U.S. Pat. No. 4,754,127, and U.S. Pat. No. 4,782,221, the disclosures of each of which are totally incorporated herein by reference.

European Patent Application 469,864-A2 (Bloomberg et al.), the disclosure of which is totally incorporated herein by reference, discloses self-clocking glyph shape codes for encoding digital data in the shapes of glyphs that are suitable for printing on hardcopy recording media. Advantageously, the glyphs are selected so that they tend not to degrade into each other when they are degraded and/or distorted as a result, for example, of being photocopied, transmitted via facsimile, and/or scanned into an electronic document processing system. Moreover, for at least some applications, the glyphs desirably are composed of printed pixel patterns containing nearly the same number of on pixels and nearly the same number of off pixels, such that the code that is rendered by printing such glyphs on substantially uniformly spaced centers appears to have a generally uniform texture. In the case of codes printed at higher spatial densities, this texture is likely to be perceived as a generally uniform gray tone. Binary image processing and convolution filtering techniques for decoding such codes are also disclosed.

European Patent Application 459,792-A2 (Zdybel et al.), the disclosure of which is totally incorporated herein by reference, discloses the provision in electronic document processing systems for printing unfiltered or filtered machine-readable digital representations of electronic documents, and human-readable renderings of them on the same record medium using the same printing process. The integration of machine-readable digital representations of electronic documents with the human-readable hardcopy renderings of them may be employed, for example, not only to enhance the precision with which the structure and content of such electronic documents can be recovered by scanning such hardcopies into electronic document processing systems, but also as a mechanism for enabling recipients of scanned-in versions of such documents to identify and process annotations that were added to the hardcopies after they were printed and/or for alerting the recipients of the scanned-in documents to alterations that may have been made to the original human-readable content of the hardcopy renderings. In addition to storage of the electronic representation of the document, provision is made for encoding information about the electronic representation of the document itself, such as file name, creation and modification dates, access and security information, and printing histories. Provision is also made for encoding information which is computed from the content of the document and other information, for purposes of authentication and verification of document integrity. Provision is also made for the encoding of information which relates to operations which are to be performed depending on handwritten marks made upon a hardcopy rendering of the document; for example, encoding instructions of what action is to be taken when a box on a document is checked. Provision is also made for encoding in the hardcopy another class of information; information about the rendering of the document specific to that hardcopy, which can include a numbered copy of that print, the identification of the machine which performed that print, the reproduction characteristics of the printer, and the screen frequency and rotation used by the printer in rendering halftones. Provision is also made for encoding information about the digital encoding mechanism itself, such as information given in standard-encoded headers about subsequently compressed or encrypted digital information.

U.S. Pat. No. 5,128,525 (Stearns et al.), the disclosure of which is totally incorporated herein by reference, discloses weighted and unweighted convolution filtering processes for decoding bitmap image space representations of self-clocking glyph shape codes and for tracking the number and locations of the ambiguities or "errors" that are encountered during the decoding. This error detection may be linked to or compared against the error statistics from an alternative decoding process, such as the binary image processing techniques that are described to increase the reliability of the decoding that is obtained.

U.S. Pat. No. 5,291,243 (Heckman et al.), the disclosure of which is totally incorporated herein by reference, discloses a system for printing security documents which have copy detection or tamper resistance in plural colors with a single pass electronic printer printing an integrated image controlled by an image generation system which electronically generates a safety background image pattern with first and second interposed color patterns which is electronically merged with alphanumeric information and a protected signature into an integrated electronic image for the printer. The single pass printer preferably has an imaging surface upon which two latent images thereof are interposed, developed with two differently colored developer materials, and simultaneously transferred to the substrate in a single pass. The color patterns are preferably oppositely varying density patterns of electronically generated pixel dot images with varying spaces therebetween. Preferably a portion of the alphanumeric information is formed by a special secure font, such as a low density shadow copy. The validating signature also preferably has two intermixed color halftone patterns with halftone density gradients varying across the signature in opposite directions, but differently from the background. Also electronically superimposed in the safety background pattern may be substantially invisible latent image pixel patterns which become visible when copied, and/or are machine readable even in copies.

U.S. Pat. No. 5,168,147 (Bloomberg), the disclosure of which is totally incorporated herein by reference, discloses binary image processing techniques for decoding bitmap image space representations of self-clocking glyph shape codes of various types (e.g., codes presented as original or degraded images, with one or a plurality of bits encoded in each glyph, while preserving the discriminability of glyphs that encode different bit values) and for tracking the number and locations of the ambiguities (sometimes referred to herein as "errors") that are encountered during the decoding of such codes. A substantial portion of the image processing that is performed in the illustrated embodiment of the invention is carried out through the use of morphological filtering operations because of the parallelism that is offered by such operations. Moreover, the error detection that is performed in accordance with this invention may be linked to or compared against the error statistics from one or more alternative decoding process, such as the convolution filtering process that is disclosed herein, to increase the reliability of the decoding that is obtained.

U.S. Pat. No. 5,091,966 (Bloomberg et al.), the disclosure of which is totally incorporated herein by reference, discloses weighted and unweighted convolution filtering processes for decoding bitmap image space representations of self-clocking glyph shape codes and for tracking the number and locations of the ambiguities or "errors" that are encountered during the decoding. This error detection may be linked to or compared against the error statistics from an alternative decoding process, such as the binary image processing techniques that are described to increase the reliability of the decoding that is obtained.

U.S. Pat. No. 5,051,779 (Hikawa), the disclosure of which is totally incorporated herein by reference, discloses an image processing system which specifies input image information on the basis of existence of a special mark or patterns printed on a job control sheet. Selected one of various image processings is executed in accordance with the existence of the special mark or patterns to thereby obtain output image information. Each of the special marks or patterns are line drawings, each drawn so as to have a certain low correlative angle to the longitudinal and transverse directions of an image provided with the special mark or patterns.

U.S. Pat. No. 5,337,361 (Wang et al.), the disclosure of which is totally incorporated herein by reference, discloses a record which contains a graphic image and an information area which are interrelated to discourage misuse of the record. The information area can overlay the graphic image and include information encoded in an error-correctable, machine-readable format which allows recovery of the information despite distortion due to the underlying graphic image. The record may also represent the image by words similar in form to words in the information area. Both the information and graphic words can then be altered when an action regarding the record takes place.

U.S. Pat. No. 5,290,654 (Sacripante et al.), the disclosure of which is totally incorporated herein by reference, discloses a process for the preparation of toner compositions which comprises dissolving a polymer, and, optionally a pigment, in an organic solvent; dispersing the resulting solution in an aqueous medium containing a surfactant or mixture of surfactants; stirring the mixture with optional heating to remove the organic solvent, thereby obtaining suspended particles of about 0.05 micron to about 2 microns in volume diameter; subsequently homogenizing the resulting suspension with an optional pigment in water and surfactant; followed by aggregating the mixture by heating, thereby providing toner particles with an average particle volume diameter of from between about 3 to about 21 microns when said pigment is present.

U.S. Pat. No. 5,278,020 (Grushkin et al.), the disclosure of which is totally incorporated herein by reference, discloses a toner composition and processes for the preparation thereof comprising the steps of: (i) preparing a latex emulsion by agitating in water a mixture of a nonionic surfactant, an anionic surfactant, a first nonpolar olefinic monomer, a second nonpolar diolefinic monomer, a free radical initiator, and a chain transfer agent; (ii) polymerizing the latex emulsion mixture by heating from ambient temperature to about 80° C. to form nonpolar olefinic emulsion resin particles of volume average diameter from about 5 nanometers to about 500 nanometers; (iii) diluting the nonpolar olefinic emulsion resin particle mixture with water; (iv) adding to the diluted resin particle mixture a colorant or pigment particles and optionally dispersing the resulting mixture with a homogenizer; (v) adding a cationic surfactant to flocculate the colorant or pigment particles to the surface of the emulsion resin particles; (vi) homogenizing the flocculated mixture at high shear to form statically bound aggregated composite particles with a volume average diameter of less than or equal to about 5 microns; (vii) heating the statically bound aggregate composite particles to form nonpolar toner sized particles; (viii) optionally halogenating the nonpolar toner sized particles to form nonpolar toner sized particles having a halopolymer resin outer surface or encapsulating shell; and (ix) isolating the nonpolar toner sized composite particles.

U.S. Pat. No. 5,308,734 (Sacripante et al.), the disclosure of which is totally incorporated herein by reference, discloses a process for the preparation of toner compositions which comprises generating an aqueous dispersion of toner fines, ionic surfactant and nonionic surfactant, adding thereto a counterionic surfactant with a polarity opposite to that of said ionic surfactant, homogenizing and stirring said mixture, and heating to provide for coalescence of said toner fine particles.

U.S. Pat. No. 5,346,797 (Kmiecik-Lawrynowicz et al.), the disclosure of which is totally incorporated herein by reference, discloses a process for the preparation of toner compositions comprising (i) preparing a pigment dispersion in a solvent, which dispersion comprises a pigment, an ionic surfactant, and optionally a charge control agent; (ii) shearing the pigment dispersion with a latex mixture comprising a counterionic surfactant with a charge polarity of opposite sign to that of said ionic surfactant, a nonionic surfactant, and resin particles, thereby causing a flocculation or heterocoagulation of the formed particles of pigment, resin, and charge control agent to form electrostatically bound toner size aggregates; and (iii) heating the statically bound aggregated particles to form said toner composition comprising polymeric resin, pigment and optionally a charge control agent.

U.S. Pat. No. 5,344,738 (Kmiecik-Lawrynowicz et al.), the disclosure of which is totally incorporated herein by reference, discloses a process for the preparation of toner compositions with a volume median particle size of from about 1 to about 25 microns, which process comprises: (i) preparing by emulsion polymerization an anionic charged polymeric latex of submicron particle size, and comprising resin particles and anionic surfactant; (ii) preparing a dispersion in water, which dispersion comprises optional pigment, an effective amount of cationic flocculent surfactant, and optionally a charge control agent; (iii) shearing the dispersion (ii) with the polymeric latex, thereby causing a flocculation or heterocoagulation of the formed particles of optional pigment, resin, and charge control agent to form a high viscosity gel in which solid particles are uniformly dispersed; (iv) stirring the above gel comprising latex particles and oppositely charged dispersion particles for an effective period of time to form electrostatically bound relatively stable toner size aggregates with narrow particle size distribution; and (v) heating the electrostatically bound aggregated particles at a temperature above the resin glass transition temperature, thereby providing the toner composition comprising resin, optional pigment, and optional charge control agent.

U.S. Pat. No. 5,364,729 (Kmiecik-Lawrynowicz et al.), the disclosure of which is totally incorporated herein by reference, discloses a process for the preparation of toner compositions comprising: (i) preparing a pigment dispersion, which dispersion comprises a pigment, an ionic surfactant, and optionally a charge control agent; (ii) shearing said pigment dispersion with a latex or emulsion blend comprising resin, a counterionic surfactant with a charge polarity of opposite sign to that of said ionic surfactant, and a nonionic surfactant; (iii) heating the above sheared blend below about the glass transition temperature (Tg) of the resin, to form electrostatically bound toner size aggregates with a narrow particle size distribution; and (iv) heating said bound aggregates above about the Tg of the resin.

U.S. Pat. No. 5,370,963 (Patel et al.), the disclosure of which is totally incorporated herein by reference, discloses a process for the preparation of toner compositions with controlled particle size comprising: (i) preparing a pigment dispersion in water, which dispersion comprises pigment, an ionic surfactant, and an optional charge control agent; (ii) shearing at high speeds the pigment dispersion with a polymeric latex comprising resin, a counterionic surfactant with a charge polarity of opposite sign to that of said ionic surfactant, and a nonionic surfactant, thereby forming a uniform homogeneous blend dispersion comprising resin, pigment, and optional charge agent; (iii) heating the above sheared homogeneous blend below about the glass transition temperature (Tg) of the resin while continuously stirring to form electrostatically bounded toner size aggregates with a narrow particle size distribution; (iv) heating the statically bound aggregated particles above about the Tg of the resin particles to provide coalesced toner comprising resin, pigment, and optional charge control agent, and subsequently optionally accomplishing (v) and (vi); (v) separating said toner; and (vi) drying said toner.

U.S. Pat. No. 5,403,693 (Patel et al.), the disclosure of which is totally incorporated herein by reference, discloses a process for the preparation of toner compositions with controlled particle size comprising: (i) preparing a pigment dispersion in water, which dispersion comprises a pigment, an ionic surfactant in amounts of from about 0.5 to about 10 percent by weight of water, and an optional charge control agent; (ii) shearing the pigment dispersion with a latex mixture comprising a counterionic surfactant with a charge polarity of opposite sign to that of said ionic surfactant, a nonionic surfactant, and resin particles, thereby causing a flocculation or heterocoagulation of the formed particles of pigment, resin, and charge control agent; (iii) stirring the resulting sheared viscous mixture of (ii) at from about 300 to about 1,000 revolutions per minute to form electrostatically bound substantially stable toner size aggregates with a narrow particle size distribution; (iv) reducing the stirring speed in (iii) to from about 100 to about 600 revolutions per minute, and subsequently adding further anionic or nonionic surfactant in the range of from about 0.1 to about 10 percent by weight of water to control, prevent, or minimize further growth or enlargement of the particles in the coalescence step (iii); and (v) heating and coalescing from about 5 to about 50° C. above about the resin glass transition temperature, Tg, which resin Tg is from between about 45° C. to about 90° C. and preferably from between about 50° C. and about 80° C. the statically bound aggregated particles to form said toner composition comprising resin, pigment, and optional charge control agent.

U.S. Pat. No. 5,418,108 (Kmiecik-Lawrynowicz et al.), the disclosure of which is totally incorporated herein by reference, discloses a process for the preparation of toner compositions with controlled particle size and selected morphology comprising (i) preparing a pigment dispersion in water, which dispersion comprises pigment, ionic surfactant, and optionally a charge control agent; (ii) shearing the pigment dispersion with a polymeric latex comprising resin of submicron size, a counterionic surfactant with a charge polarity of opposite sign to that of said ionic surfactant, and a nonionic surfactant, thereby causing a flocculation or heterocoagulation of the formed particles of pigment, resin, and charge control agent, and generating a uniform blend dispersion of solids of resin, pigment, and optional charge control agent in the water and surfactants; (iii) (a) continuously stirring and heating the above sheared blend to form electrostatically bound toner size aggregates; or (iii) (b) further shearing the above blend to form electrostatically bound well packed aggregates; or (iii) (c) continuously shearing the above blend, while heating to form aggregated flake-like particles; (iv) heating the above formed aggregated particles about above the Tg of the resin to provide coalesced particles of toner; and optionally (v) separating said toner particles from water and surfactants; and (vi) drying said toner particles.

U.S. Pat. No. 5,405,728 (Hopper et al.), the disclosure of which is totally incorporated herein by reference, discloses a process for the preparation of toner compositions comprising (i) preparing a pigment dispersion in water, which dispersion comprises a pigment, an ionic surfactant, and optionally a charge control agent; (ii) shearing the pigment dispersion with a latex containing a controlled solid contents of from about 50 weight percent to about 20 percent of polymer or resin, counterionic surfactant, and nonionic surfactant in water, counterionic surfactant with a charge polarity of opposite sign to that of said ionic surfactant, thereby causing a flocculation or heterocoagulation of the formed particles of pigment, resin, and charge control agent to form a dispersion of solids of from about 30 weight percent to 2 percent comprising resin, pigment, and optionally charge control agent in the mixture of nonionic, anionic, and cationic surfactants; (iii) heating the above sheared blend at a temperature of from about 5° to about 25° C. about below the glass transition temperature (Tg) of the resin while continuously stirring to form toner sized aggregates with a narrow size dispersity; and (iv) heating the electrostatically bound aggregated particles at a temperature of from about 5° to about 50° C. about above the (Tg) of the resin to provide a toner composition comprising resin, pigment, and optionally a charge control agent.

U.S. Pat. No. 5,348,832 (Sacripante et al.), the disclosure of which is totally incorporated herein by reference, discloses a toner composition comprising pigment and a sulfonated polyester of the formula or as essentially represented by the formula $$-\!\left(O_2C-R-CO_2R'\right)_n\!-\!\left(O_2C-\underset{\underset{SO_3\ \ M^{\oplus}}{|\ominus}}{R}-CO_2R'\right)_o\!-$$

wherein M is an ion independently selected from the group consisting of hydrogen, ammonium, an alkali metal ion, an alkaline earth metal ion, and a metal ion; R is independently selected from the group consisting of aryl and alkyl; R' is independently selected from the group consisting of alkyl and oxyalkylene; and n and o represent random segments; and wherein the sum of n and o are equal to 100 mole percent. The toner is prepared by an in situ process which comprises the dispersion of a sulfonated polyester of the formula or as essentially represented by the formula $$-\!\left(O_2C-R-CO_2R'\right)_n\!-\!\left(O_2C-\underset{\underset{SO_3\ \ M^{\oplus}}{|\ominus}}{R}-CO_2R'\right)_o\!-$$

wherein M is an ion independently selected from the group consisting of hydrogen, ammonium, an alkali metal ion, an alkaline earth metal ion, and a metal ion; R is independently selected from the group consisting of aryl and alkyl; R' is independently selected from the group consisting of alkyl and oxyalkylene; and n and o represent random segments; and wherein the sum of n and o are equal to 100 mole percent, in a vessel containing an aqueous medium of an anionic surfactant and a nonionic surfactant at a temperature of from about 100° C. to about 180° C., thereby obtaining suspended particles of about 0.05 micron to about 2 microns in volume average diameter; subsequently homogenizing the resulting suspension at ambient temperature; followed by aggregating the mixture by adding thereto a mixture of cationic surfactant and pigment particles to effect aggregation of said pigment and sulfonated polyester particles; followed by heating the pigment-sulfonated polyester particle aggregates above the glass transition temperature of the sulfonated polyester causing coalescence of the aggregated particles to provide toner particles with an average particle volume diameter of from between 3 to 21 microns.

U.S. Pat. No. 5,366,841 (Patel et al.), the disclosure of which is totally incorporated herein by reference, discloses a process for the preparation of toner compositions comprising: (i) preparing a pigment dispersion in water, which dispersion comprises a pigment, an ionic surfactant, and optionally a charge control agent; (ii) shearing the pigment dispersion with a latex blend comprising resin particles, a counterionic surfactant with a charge polarity of opposite sign to that of said ionic surfactant, and a nonionic surfactant, thereby causing a flocculation or heterocoagulation of the formed particles of pigment, resin, and charge control agent to form a uniform dispersion of solids in the water, and surfactant; (iii) heating the above sheared blend at a critical temperature region about equal to or above the glass transition temperature (Tg) of the resin, while continuously stirring, to form electrostatically bounded toner size aggregates with a narrow particle size distribution and wherein said critical temperature is from about 0° C. to about 10° C. above the resin Tg, and wherein the resin Tg is from about 30° C. to about 65° C. and preferably in the range of from about 45° C. to about 65° C.; (iv) heating the statically bound aggregated particles from about 10° C. to about 45° C. above the Tg of the resin particles to provide a toner composition comprising polymeric resin, pigment, and optionally a charge control agent; and (v) optionally separating and drying said toner.

U.S. Pat. No. 5,501,935 (Patel et al.), the disclosure of which is totally incorporated herein by reference, discloses a process for the preparation of toner compositions consisting essentially of (i) preparing a pigment dispersion, which dispersion comprises a pigment, an ionic surfactant, and optionally a charge control agent; (ii) shearing said pigment dispersion with a latex or emulsion blend comprising resin, a counterionic surfactant with a charge polarity of opposite sign to that of said ionic surfactant, and a nonionic surfactant; (iii) heating the above sheared blend below about the glass transition temperature (Tg) of the resin to form electrostatically bound toner size aggregates with a narrow particle size distribution; (iv) subsequently adding further anionic or nonionic surfactant solution to minimize further growth in the coalescence (v); and (v) heating said bound aggregates above about the Tg of the resin and wherein said heating is from a temperature of about 103° to about 120° C., and wherein said toner compositions are spherical in shape.

U.S. Pat. No. 5,496,676 (Croucher et al.), the disclosure of which is totally incorporated herein by reference, discloses a process comprising: (i) preparing a pigment dispersion comprising pigment, ionic surfactant, and optional charge control agent; (ii) mixing at least two resins in the form of latexes, each latex comprising a resin, ionic and nonionic surfactants, and optionally a charge control agent, and wherein the ionic surfactant has a countercharge to the ionic surfactant of (i) to obtain a latex blend; (iii) shearing said pigment dispersion with the latex blend of (ii) comprising resins, counterionic surfactant with a charge polarity of opposite sign to that of said ionic surfactant, and a nonionic surfactant; (iv) heating the above sheared blends of (iii) below about the glass transition temperature (Tg) of the resin, to form electrostatically bound toner size aggregates with a narrow particle size distribution; and (v) subsequently adding further anionic surfactant solution to minimize further growth of the bound aggregates (vi); (vi) heating said bound aggregates above about the glass transition temperature Tg of the resin to form stable toner particles; and optionally (vii) separating and drying the toner.

U.S. Pat. No. 5,527,658 (Hopper et al.), the disclosure of which is totally incorporated herein by reference, discloses a process for the preparation of toner comprising: (i) preparing a pigment dispersion comprising pigment, an ionic surfactant, and optionally a charge control agent; (ii) shearing said pigment dispersion with a latex comprising resin, a counterionic surfactant with a charge polarity of opposite sign to that of said ionic surfactant, and a nonionic surfactant; (iii) heating the above sheared blend of (ii) about below the glass transition temperature (Tg) of the resin, to form electrostatically bound toner size aggregates with a volume average diameter of from between about 2 and about 15 microns and with a narrow particle size distribution as reflected in the particle diameter GSD of between about 1.15 and about 1.30, followed by the addition of a water insoluble transition metal containing powder ionic surfactant in an amount of from between about 0.05 and about 5 weight percent based on the weight of the aggregates; and (iv) heating said bound aggregates about above the Tg of the resin to form toner.

U.S. Pat. No. 5,585,215 (Ong et al.), the disclosure of which is totally incorporated herein by reference, discloses a toner comprising color pigment and an addition polymer resin, wherein said resin is generated by emulsion polymerization of from 70 to 85 weight percent of styrene, from about 5 to about 20 weight percent of isoprene, from about 1 to about 15 weight percent of acrylate, or from about 1 to about 15 weight percent of methacrylate, and from about 0.5 to about 5 weight percent of acrylic acid.

U.S. Pat. No. 5,650,255 (Ng et al.), the disclosure of which is totally incorporated herein by reference, discloses an in situ chemical process for the preparation of toner comprising (i) the provision of a latex, which latex comprises polymeric resin particles, an ionic surfactant, and a nonionic surfactant; (ii) providing a pigment dispersion, which dispersion comprises a pigment solution, a counterionic surfactant with a charge polarity of opposite sign to that of said ionic surfactant, and optionally a charge control agent; (iii) mixing said pigment dispersion with said latex with a stirrer equipped with an impeller, stirring at speeds of from about 100 to about 900 rpm for a period of from about 10 minutes to about 150 minutes; (iv) heating the above resulting blend of latex and pigment mixture to a temperature below about the glass transition temperature (Tg) of the resin to form electrostatically bound toner size aggregates; (v) adding further aqueous ionic surfactant or stabilizer in the range amount of from about 0.1 percent to 5 percent by weight of reactants to stabilize the above electrostatically bound toner size aggregates; (vi) heating said electrostatically bound toner sized aggregates above about the Tg of the resin to form toner size particles containing pigment, resin and optionally a charge control agent; (vii) optionally isolating said toner, optionally washing with water; and optionally (viii) drying said toner.

U.S. Pat. No. 5,650,256 (Veregin et al.), the disclosure of which is totally incorporated herein by reference, discloses a process for the preparation of toner comprising: (i) preparing a pigment dispersion, which dispersion comprises a pigment and an ionic surfactant; (ii) shearing said pigment dispersion with a latex or emulsion blend comprising resin, a counterionic surfactant with a charge polarity of opposite sign to that of said ionic surfactant, and a nonionic surfactant, and wherein said resin contains an acid functionality; (iii) heating the above sheared blend below about the glass transition temperature (Tg) of the resin to form electrostatically bound toner size aggregates; (iv) adding anionic surfactant to stabilize the aggregates obtained in (iii); (v) coalescing said aggregates by heating said bound aggregates above about the Tg of the resin; (vi) reacting said resin of (v) with acid functionality with a base to form an acrylic acid salt, and which salt is ion exchanged in water with a base or a salt, optionally in the presence of metal oxide particles, to control the toner triboelectrical charge, which toner comprises resin and pigment; and (vii) optionally drying the toner obtained.

U.S. Pat. No. 5,376,172 (Tripp et al.), the disclosure of which is totally incorporated herein by reference, discloses a process for preparing silane metal oxides comprising reacting a metal oxide with an amine compound to form an amine metal oxide intermediate, and subsequently reacting said intermediate with a halosilane. Also disclosed are toner compositions for electrostatic imaging processes containing the silane metal oxides thus prepared as charge enhancing additives.

U.S. Pat. No. 5,922,501 (Cheng et al.), the disclosure of which is totally incorporated herein by reference, discloses a process for the preparation of toner comprising blending an aqueous colorant dispersion and a latex resin emulsion, which latex resin is generated from a dimeric acrylic acid, an oligomer acrylic acid, or mixtures thereof and a monomer; heating the resulting mixture at a temperature about equal, or below about the glass transition temperature (Tg) of the latex resin to form aggregates; heating the resulting aggregates at a temperature about equal to, or above about the Tg of the latex resin to effect coalescence and fusing of the aggregates; and optionally isolating the toner product, washing, and drying.

U.S. Pat. No. 6,132,924 (Patel et al.), the disclosure of which is totally incorporated herein by reference, discloses a process for the preparation of toner which comprises mixing a colorant, a latex, and two coagulants, followed by aggregation and coalescence. In one embodiment, the first coagulant is a polyaluminum hydroxy halide and the second coagulant is a cationic surfactant.

U.S. Pat. No. 5,633,109 (Jennings et al.), the disclosure of which is totally incorporated herein by reference, discloses an ink composition which comprises an aqueous liquid vehicle, a photochromic material, and a vesicle-forming lipid, wherein vesicles of the lipid are present in the ink.

U.S. Pat. No. 5,593,486 (Oliver et al.), the disclosure of which is totally incorporated herein by reference, discloses a hot melt ink composition comprising (a) an ink vehicle, said ink vehicle being a solid at about 25° C. and having a viscosity of from about 1 to about 20 centipoise at a temperature suitable for hot melt ink jet printing, said temperature being greater than about 45° C., (b) a photochromic material, (c) an optional colorant, and (d) an optional propellant.

U.S. Pat. No. 5,551,973 (Oliver et al.), the disclosure of which is totally incorporated herein by reference, discloses an ink composition which comprises an aqueous phase, an oil phase, a photochromic material, and a surfactant, said ink exhibiting a liquid crystalline gel phase at a first temperature and a liquid microemulsion phase at a second temperature higher than the first temperature.

U.S. Pat. No. 5,759,729 (Martin et al.), the disclosure of which is totally incorporated herein by reference, discloses a toner composition for the development of electrostatic latent images which comprises particles comprising a mixture of a resin and a photochromic material. Another embodiment of the present invention is directed to a liquid developer composition for the development of electrostatic latent images which comprises a nonaqueous liquid vehicle and a photochromic material, wherein the liquid developer has a resistivity of from about $10^8$ to about $10^{11}$ ohm-cm and a viscosity of from about 25 to about 500 centipoise. Yet another embodiment of the present invention is directed to a liquid developer composition for the development of electrostatic latent images which comprises a nonaqueous liquid vehicle, a charge control agent, and toner particles comprising a mixture of a resin and a photochromic material.

U.S. Pat. No. 5,710,420 (Martin et al.), the disclosure of which is totally incorporated herein by reference, discloses a method of embedding and recovering machine readable information on a substrate which comprises (a) writing data in a predetermined machine readable code format on the substrate with a photochromic marking material having a first state corresponding to a first absorption spectrum and a second state corresponding to a second absorption spectrum; and (b) thereafter effecting a photochromic change in at least some of the photochromic marking material from the first state to the second state.

James T. C. Wojtyk, Peter M. Kazmaier, and Erwin Buncel, "Effects of Metal Ion Complexation on the Spiropyran-Merocyanine Interconversion: Development of a Thermally Stable Photo-Switch," *Chem. Commun.* 1998, p. 1703, the disclosure of which is totally incorporated herein by reference, discloses spectrophotometric absorption and fluorescence measurements of spiropyrans

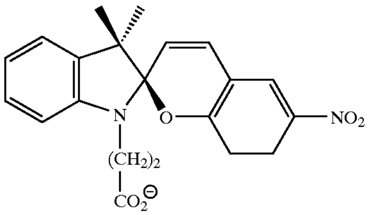

and

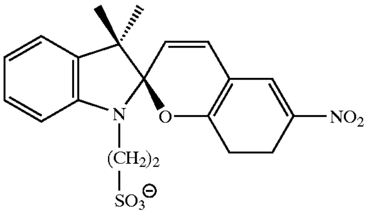

modified with chelating functionalities, in the presence of $Ca^{2+}$ and $Zn^{2+}$, that provide evidence of a thermally stable spiropyran-merocyanine photoswitch that is modulated by the metal cations.

While known compositions and processes are suitable for their intended purposes, a need remains for improved electrostatic toner compositions. In addition, a need remains for marking particles with photochromic characteristics. Further, a need remains for processes for preparing documents with images having photochromic characteristics. Additionally, a need remains for processes and materials that enable the placement of encoded information on documents which is not detectable to the reader but which is machine readable. There is also a need for photochromic marking particles that are thermally stable. In addition, there is a need for photochromic marking particles wherein both resonance forms of the photochromic material are stable. Further, there is a need for photochromic marking particles wherein the two resonance forms of the photochromic material are addressable at different wavelengths. Additionally, there is a need for photochromic marking particles wherein both resonance forms of the photochromic material are stable for reasonable periods of time without the need for constant irradiation to maintain the resonance form. A need also remains for materials and processes that generate images that cannot be easily or accurately photocopied or scanned.

SUMMARY OF THE INVENTION

The present invention is directed to marking particles which comprise a resin, a chelating agent, and a spiropyran material of the formula

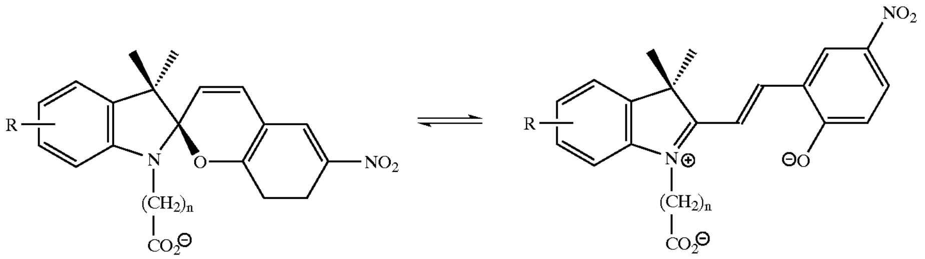

or

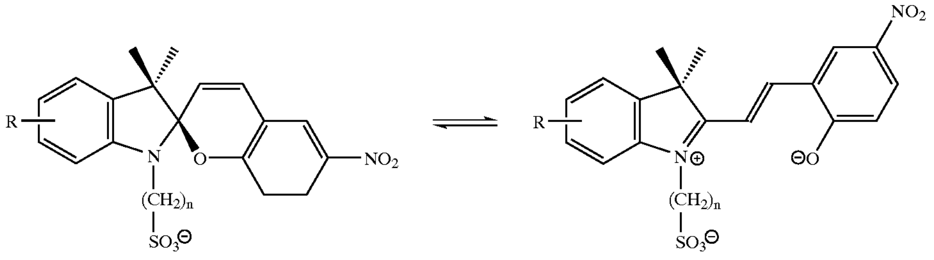

wherein n is an integer representing the number of repeat $—CH_2—$ units and R is —H or $—CH{=}CH_2$. The marking particles are prepared by an emulsion aggregation process.

DETAILED DESCRIPTION OF THE INVENTION

The marking particles of the present invention contain a spiropyran material of the formula

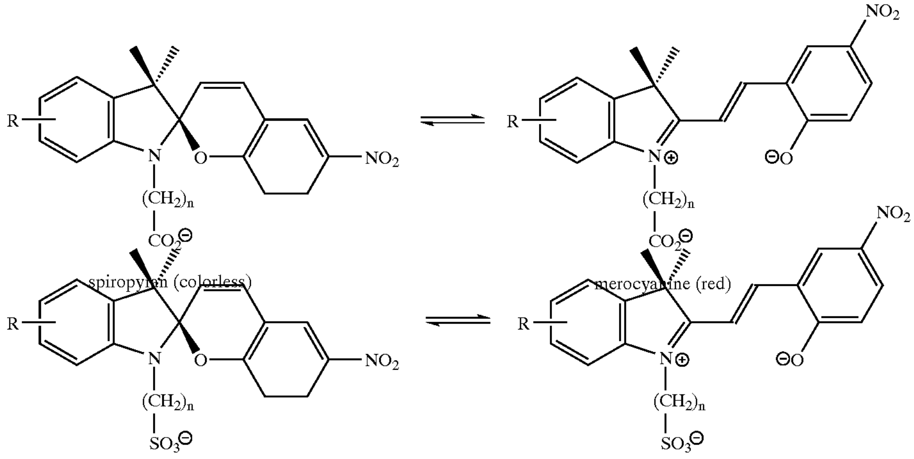

or spiropyran (colorless) mercocyanine (red)

wherein n is an integer representing the number of repeat $—CH_2—$ units, typically being from about 2 to about 8, although the value of n can be outside of this range, and R is —H or $—CH{=}CH_2$. The anionic —COO—and $—SO_3—$ groups are, of course, accompanied by cations. Any desired or suitable cations can be employed. Materials of the formula

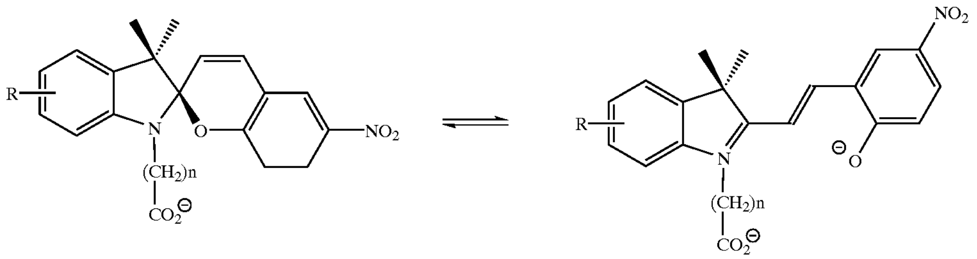

can be prepared by the reaction of 2,3,3-trimethylindolenine with β-iodopropionic acid, followed by condensation with 5-nitrosalicaldehyde in the presence of triethylamine. Materials of the formula

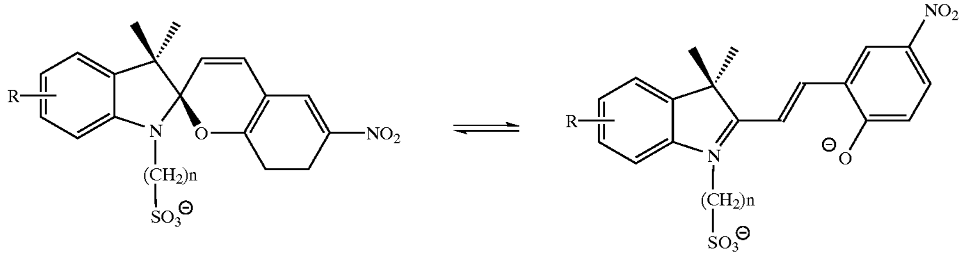

can be prepared by the reaction of 2,3,3-trimethylindolenine with γ-sulfone, followed by condensation with 5-nitrosalicaldehyde in the presence of triethylamine. The spiropyran is present in the marking particles in any desired or effective amount, typically at least about 0.01 percent by weight of the marking particles, preferably at least about 0.05 percent by weight of the marking particles, and more preferably at least about 0.5 percent by weight of the marking particles, and typically no more than about 5 percent by weight of the marking particles, although the amount can be outside of these ranges.

The marking particles of the present invention also contain a chelating agent with which the merocyanine form of the spiropyran can chelate to stabilize this form of the molecule. Examples of suitable chelating agents include metal salts in the +2 state, such as $Ca^{2+}$, $Zn^{2+}$, $Mg^{2+}$, transition metals, and the like, wherein the accompanying anion or anions are such that the metal salt is water soluble, such as nitrate, chloride, bromide, and the like. The chelating agent is present in the marking particles in any desired or effective amount, typically in a molar ratio to the spiropyran of at least about 1 mole of chelating agent for every 1 mole of spiropyran, preferably at least about 2 moles of chelating agent for every 1 mole of spiropyran, more preferably at least about 3 moles of chelating agent for every 1 mole of spiropyran, and even more preferably at least about 5 moles of chelating agent for every 1 mole of spiropyran, and typically no more than about 10 moles of chelating agent for every 1 mole of spiropyran, although there is no upper limit on the amount of chelating agent that can be present, and although the amount of chelating agent can be outside of these ranges.

The marking particles comprise the spiropyran compound and chelating agent well dispersed in a resin (for example, a random copolymer of a styrene/n-butyl acrylate/acrylic acid resin). Optionally, external surface additives are present on the surfaces of the marking particles. Examples of suitable resins include poly(styrene/butadiene), poly(p-methyl styrene/butadiene), poly(m-methyl styrene/butadiene), poly(α-methyl styrene/butadiene), poly(methyl methacrylate/butadiene), poly(ethyl methacrylate/butadiene), poly(propyl methacrylate/butadiene), poly(butyl methacrylate/butadiene), poly(methyl acrylate/butadiene), poly(ethyl acrylate/butadiene), poly(propyl acrylate/butadiene), poly(butyl acrylate/butadiene), poly(styrene/isoprene), poly(p-methyl styrene/isoprene), poly(m-methyl styrene/isoprene), poly(α-methyl styrene/isoprene), poly(methyl methacrylate/isoprene), poly(ethyl methacrylate/isoprene), poly(propyl methacrylate/isoprene), poly(butyl methacrylate/isoprene), poly(methyl acrylate/isoprene), poly(ethyl acrylate/isoprene), poly(propyl acrylate/isoprene), poly(butylacrylate-isoprene), poly(styrene/n-butyl acrylate/acrylic acid), poly(styrene/n-butyl methacrylate/acrylic acid), poly(styrene/n-butyl methacrylate/β-carboxyethyl acrylate), poly(styrene/n-butyl acrylate/β-carboxyethyl acrylate) poly(styrene/butadiene/methacrylic acid), polyethylene terephthalate, polypropylene terephthalate, polybutylene terephthalate, polypentylene terephthalate, polyhexalene terephthalate, polyheptadene terephthalate, polyoctalene-terephthalate, sulfonated polyesters such as those disclosed in U.S. Pat. No. 5,348,832, and the like, as well as mixtures thereof. The resin is present in the marking particles in any desired or effective amount, typically at least about 75 percent by weight of the marking particles, and preferably at least about 85 percent by weight of the marking particles, and typically no more than about 99 percent by weight of the marking particles, and preferably no more than about 98 percent by weight of the marking particles, although the amount can be outside of these ranges.

The marking particles optionally can also contain charge control additives, such as alkyl pyridinium halides, bisulfates, the charge control additives disclosed in U.S. Pat. No. 3,944,493, U.S. Pat. No. 4,007,293, U.S. Pat. No. 4,079,014, U.S. Pat. No. 4,394,430, and U.S. Pat. No. 4,560,635, the disclosures of each of which are totally incorporated herein by reference, and the like, as well as mixtures thereof. Charge control additives are present in the marking particles in any desired or effective amounts, typically at least about 0.1 percent by weight of the marking particles, and typically no more than about 5 percent by weight of the marking particles, although the amount can be outside of this range.

Examples of optional surface additives include metal salts, metal salts of fatty acids, colloidal silicas, and the like, as well as mixtures thereof. External additives are present in any desired or effective amount, typically at least about 0.1 percent by weight of the marking particles, and typically no more than about 2 percent by weight of the marking particles, although the amount can be outside of this range, as disclosed in, for example, U.S. Pat. No. 3,590,000, U.S. Pat. No. 3,720,617, U.S. Pat. No. 3,655,374 and U.S. Pat. No. 3,983,045, the disclosures of each of which are totally incorporated herein by reference. Preferred additives include zinc stearate and AEROSIL R812® silica, available from Degussa. The external additives can be added during the aggregation process or blended onto the formed particles.

The marking particles of the present invention are prepared by an emulsion aggregation process. The emulsion aggregation process generally entails (a) preparing a latex emulsion comprising resin particles, (b) combining the latex emulsion with the chelating agent and the spiropyran (and any other optional colorant(s)), (c) heating the latex emulsion containing the resin, the spiropyran, and the chelating agent to a temperature below the glass transition temperature of the resin, and (d) after heating the latex emulsion containing the resin, the spiropyran, and the chelating agent to a temperature below the glass transition temperature of the resin, heating the latex emulsion containing the resin, the spiropyran, and the chelating agent to a temperature above the glass transition temperature of the resin. It is not important whether the chelating agent and the spiropyran are added to the latex emulsion or whether the latex emulsion is added to the chelating agent and the spiropyran. In a more specific embodiment, the emulsion aggregation process entails (a) preparing a dispersion of the spiropyran (and any other optional colorant(s)) and the chelating agent in a solvent, (b) admixing the spiropyran dispersion with a latex emulsion comprising resin particles and an optional flocculating agent, thereby causing flocculation or heterocoagulation of formed particles of spiropyran, chelating agent, and resin to form electrostatically bound aggregates, (c) heating the electrostatically bound aggregates at a temperature below the glass transition temperature ($T_g$) of the resin to form stable aggregates, and (d) heating the stable aggregates at a temperature above the glass transition temperature ($T_g$) of the resin to coalesce the stable aggregates into marking particles. Again, it is not important whether the chelating agent and the spiropyran are added to the latex emulsion or whether the latex emulsion is added to the chelating agent and the spiropyran. One specific example of an emulsion aggregation process entails (1) preparing a spiropyran dispersion in a solvent (such as water), which dispersion comprises the spiropyran, the chelating agent, an ionic surfactant, and an optional charge control agent (and any other optional colorant(s)); (2) shearing the spiropyran dispersion with a latex emulsion comprising (a) a surfactant which is either (i) counterionic, with a charge polarity of opposite sign to that of said ionic surfactant, or (ii) nonionic, and (b) resin particles having an average particle diameter of less than about 1 micron, thereby causing flocculation or heterocoagulation of formed particles of spiropyran, chelating agent, resin, and optional charge control agent to form electrostatically bound aggregates, (3) heating the electrostatically bound aggregates at a temperature below the glass transition temperature ($T_g$) of the resin to form stable aggregates (the stable aggregates typically have an average particle diameter of at least about 1 micron, and preferably at least about 2 microns, and typically have an average particle diameter of no more than about 25 microns, and preferably no more than about 10 microns, although the particle size can be outside of this range; the stable aggregates typically have a relatively narrow particle size distribution of GSD=about 1.16 to GSD=about 1.25, although the particle size distribution can be outside of this range), and (4) adding an additional amount of the ionic surfactant to the aggregates to stabilize them further, prevent further growth, and prevent loss of desired narrow particle size distribution, and heating the aggregates to a temperature above the resin glass transition temperature ($T_g$) to provide coalesced marking particles (typically from about 1 to about 25 microns in average particle diameter, and preferably from about 2 to about 10 microns in average particle diameter, although the particle size can be outside of these ranges) comprising resin, spiropyran, chelating agent, and optional charge control agent. Heating can be at a temperature typically of from about 5 to about 50° C. above the resin glass transition temperature, although the temperature can be outside of this range, to coalesce the electrostatically bound aggregates. The coalesced particles differ from the uncoalesced aggregates primarily in morphology; the uncoalesced particles have greater surface area, typically having a "grape cluster" shape, whereas the coalesced particles are reduced in surface area, typically having a "potato" shape or even a spherical shape. The particle morphology can be controlled by adjusting conditions during the coalescence process, such as temperature, coalescence time, and the like. Subsequently, the marking particles are washed to remove excess water soluble surfactant or surface absorbed surfactant, and are then dried to produce spiropyran-containing polymeric marking particles. Another specific example of an emulsion aggregation process entails using a flocculating or coagulating agent such as poly(aluminum chloride) or poly (aluminum sulfosilicate) instead of a counterionic surfactant of opposite polarity to the ionic surfactant in the latex formation; in this process, the aggregation of submicron latex and colorant and the other optional additives is controlled by the amount of coagulant added, followed by the temperature to which the resultant blend is heated; for example, the closer the temperature is to the $T_g$ of the resin, the bigger is the particle size. This process comprises (1) preparing a dispersion of the spiropyran in a solvent, which dispersion comprises the spiropyran, the chelating agent, and an ionic surfactant; (2) shearing the spiropyran dispersion with a latex mixture comprising (a) a flocculating agent, (b) a nonionic surfactant, and (c) the resin, thereby causing flocculation or heterocoagulation of formed particles of the spiropyran, the flocculating agent, and the resin to form electrostatically bound aggregates; and (3) heating the electrostatically bound aggregates to form stable aggregates. The aggregates obtained are generally particles in the range of from about 1 to about 25 microns in average particle diameter, and preferably from about 2 to about 10 microns in average particle diameter, although the particle size can be outside of these ranges, with relatively narrow particle size distribution. To the aggregates is added an alkali metal base, such as an aqueous sodium hydroxide solution, to raise the pH of the aggregates from a pH value which is in the range of from about 2.0 to about 3.0 to a pH value in the range of from about 7.0 to about 9.0, and, during the coalescence step, the solution can, if desired, be adjusted to a more acidic pH to adjust the particle morphology. The coagulating agent typically is added in an acidic solution (for example, a 1 molar nitric acid solution) to the mixture of ionic latex and dispersed spiropyran, and during this addition step the viscosity of the mixture increases. Thereafter, heat and stirring are applied to induce aggregation and formation of micron-sized particles. When the desired particle size is achieved, this size can be frozen by increasing the pH of the mixture, typically to from about 7 to about 9, although the pH can be outside of this range. Thereafter, the temperature of the mixture can be increased to the desired coalescence temperature, typically from about 80 to about 95° C., although the temperature can be outside of this range. Subsequently, the particle morphology can be adjusted by dropping the pH of the mixture, typically to values of from about 3.5 to about 5.5, although the pH can be outside of this range. Yet another example of an emulsion aggregation process comprises using a combination of a metal coagulant such as polyaluminum chloride and a counterionic surfactant as coagulating agents to obtain marking particle size aggregates upon heating to a temperature below the resin $T_g$, followed by adjusting the pH to a basic region (for example, pH in the range of from about 7.0 to about 9.0) with a metal hydroxide, followed by raising the temperature to coalesce the aggregates, wherein the morphology of the particles is controlled by reducing the pH with an acid to a pH value of in the range of from about 3.5 to about 5.5. The resulting marking particles are then washed and dried.

In embodiments of the present invention wherein the spiropyran is incorporated into the backbone of the polymer, the process is similar except that the spiropyran is included as one of the latex monomers instead of with the coagulating agent. In these embodiments, the emulsion aggregation process generally entails (a) preparing a latex emulsion comprising particles of the resin, said resin comprising a polymer which comprises at least two different monomers, one of said monomers being the spiropyran, (b) combining the latex emulsion with the chelating agent (and any other optional colorant(s)), (c) heating the latex emulsion containing the resin and the chelating agent to a temperature below the glass transition temperature of the resin, and (d) after heating the latex emulsion containing the resin and the chelating agent to a temperature below the glass transition temperature of the resin, heating the latex emulsion containing the resin and the chelating agent to a temperature above the glass transition temperature of the resin. It is not important whether the chelating agent is added to the latex emulsion or whether the latex emulsion is added to the chelating agent. In a more specific embodiment, the emulsion aggregation process entails (a) preparing a dispersion of the chelating agent (and any other optional colorant(s)) in a solvent, (b) admixing the dispersion with a latex emulsion comprising particles of the resin and an optional flocculating agent, said resin comprising a polymer which comprises at least two different monomers, one of said monomers being the spiropyran, thereby causing flocculation or heterocoagulation of formed particles of chelating agent and resin to form electrostatically bound aggregates, (c) heating the electrostatically bound aggregates at a temperature below the glass transition temperature of the resin to form stable aggregates, and (d) heating the stable aggregates at a temperature above the glass transition temperature of the resin to coalesce the stable aggregates into marking particles. Again, it is not important whether the chelating agent is added to the latex emulsion or whether the latex emulsion is added to the chelating agent. One specific example of an emulsion aggregation process entails (1) preparing a dispersion in a solvent (such as water), which dispersion comprises the chelating agent, an ionic surfactant, and an optional charge control agent (and any other optional colorant(s)); (2) shearing the dispersion with a latex emulsion comprising (a) a surfactant which is either (i) counterionic, with a charge polarity of opposite sign to that of said ionic surfactant, or (ii) nonionic, and (b) particles of the resin having an average particle diameter of less than about 1 micron, said resin comprising a polymer which comprises at least two different monomers, one of said monomers being the spiropyran, thereby causing flocculation or heterocoagulation of formed particles of chelating agent, resin, and optional charge control agent to form electrostatically bound aggregates, (3) heating the electrostatically bound aggregates at a temperature below the glass transition temperature of the resin to form stable aggregates, and (4) adding an additional amount of the ionic surfactant to the aggregates to stabilize them further, prevent further growth, and prevent loss of desired narrow particle size distribution, and heating the aggregates to a temperature above the resin glass transition temperature to provide coalesced marking particles comprising resin, chelating agent, and optional charge control agent. In another specific embodiment wherein a flocculating agent other than a surfactant is used, this process comprises (1) preparing a dispersion of the chelating agent in a solvent, which dispersion comprises the chelating agent and an ionic surfactant; (2) shearing the dispersion with a latex mixture comprising (a) a flocculating agent, (b) a nonionic surfactant, and (c) the resin, said resin comprising a polymer which comprises at least two different monomers, one of said monomers being the spiropyran, thereby causing flocculation or heterocoagulation of formed particles of the flocculating agent and the resin to form electrostatically bound aggregates; and (3) heating the electrostatically bound aggregates to form stable aggregates.

Examples of suitable ionic surfactants include anionic surfactants, such as sodium dodecylsulfate, sodium dodecylbenzene sulfonate, sodium dodecylnaphthalenesulfate, dialkyl benzenealkyl sulfates and sulfonates, abitic acid, NEOGEN R® and NEOGEN SC® available from Kao, DOWFAX®, available from Dow Chemical Co., and the like, as well as mixtures thereof. Anionic surfactants can be employed in any desired or effective amount, typically at least about 0.01 percent by weight of monomers used to prepare the copolymer resin, and preferably at least about 0.1 percent by weight of monomers used to prepare the copolymer resin, and typically no more than about 10 percent by weight of monomers used to prepare the copolymer resin, and preferably no more than about 5 percent by weight of monomers used to prepare the copolymer resin, although the amount can be outside of these ranges.

Examples of suitable ionic surfactants also include cationic surfactants, such as dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$, and $C_{17}$ trimethyl ammonium bromides, halide salts of quaternized polyoxyethylalkylamines, dodecylbenzyl triethyl ammonium chloride, MIRAPOL® and ALKAQUAT® (available from Alkaril Chemical Company), SANIZOL® (benzalkonium chloride, available from Kao Chemicals), and the like, as well as mixtures thereof. Cationic surfactants can be employed in any desired or effective amounts, typically at least about 0.1 percent by weight of water, and typically no more than about 5 percent by weight of water, although the amount can be outside of this range. Preferably the molar ratio of the cationic surfactant used for flocculation to the anionic surfactant used in latex preparation from about 0.5:1 to about 4:1, and preferably from about 0.5:1 to about 2:1, although the relative amounts can be outside of these ranges.

Examples of suitable nonionic surfactants include polyvinyl alcohol, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxypoly(ethyleneoxy) ethanol (available from Rhone-Poulenc as IGEPAL CA-210®, IGEPAL CA-520®, IGEPAL CA-720®, IGEPAL CO-890®, IGEPAL CO-720®, IGEPAL CO-290®, IGEPAL CA-210®, ANTAROX 890® and ANTAROX 897®), and the like, as well as mixtures thereof. The nonionic surfactant can be present in any desired or effective amount, typically at least about 0.01 percent by weight of monomers used to prepare the copolymer resin, and preferably at least about 0.1 percent by weight of monomers used to prepare the copolymer resin, and typically no more than about 10 percent by weight of monomers used to prepare the copolymer resin, and preferably no more than about 5 percent by weight of monomers used to prepare the copolymer resin, although the amount can be outside of these ranges.

Examples of suitable bases include sodium hydroxide, potassium hydroxide, ammonium hydroxide, cesium hydroxide, barium hydroxide, and the like, with sodium hydroxide being preferred.

Examples of suitable acids include nitric acid, sulfuric acid, hydrochloric acid, acetic acid, citric acid, and the like, with nitric acid being preferred.

Examples of suitable metal coagulants include aluminum chloride, zinc chloride, magnesium chloride, polyaluminum chloride, polyaluminum sulfosilicate, and the like, with polyaluminum chloride being preferred.

Emulsion aggregation processes suitable for making the marking particles for the present invention have also been disclosed in, for example, U.S. Pat. No. 5,290,654, U.S. Pat. No. 5,278,020, U.S. Pat. No. 5,308,734, U.S. Pat. No. 5,346,797, U.S. Pat. No. 5,344,738, U.S. Pat. No. 5,364,729, U.S. Pat. No. 5,370,963, U.S. Pat. No. 5,403,693, U.S. Pat. No. 5,418,108, U.S. Pat. No. 5,405,728, U.S. Pat. No. 5,348,832, U.S. Pat. No. 5,366,841, U.S. Pat. No. 5,501,935, U.S. Pat. No. 5,496,676, U.S. Pat. No. 5,527,658, U.S. Pat. No. 5,585,215, U.S. Pat. No. 5,650,255, U.S. Pat. No. 5,650,256, U.S. Pat. No. 5,376,172, U.S. Pat. No. 5,922,501, and U.S. Pat. No. 6,132,924, the disclosures of each of which are totally incorporated herein by reference.

In one specific embodiment, the spiropyran is incorporated into the backbone of the resin. In this embodiment, the spiropyran is first substituted with a vinyl group via Friedel-Crafts alkylation, and the spiropyran is then included as a comonomer in the polymerization process.

Optionally, the marking particles of the present invention can also contain a colorant in addition to the spiropyran material. Typically, the colorant material is a pigment, although dyes can also be employed. Examples of suitable pigments and dyes are disclosed in, for example, U.S. Pat. No. 4,788,123, U.S. Pat. No. 4,828,956, U.S. Pat. No. 4,894,308, U.S. Pat. No. 4,948,686, U.S. Pat. No. 4,963,455, and U.S. Pat. No. 4,965,158, the disclosures of each of which are totally incorporated herein by reference. Specific examples of suitable dyes and pigments include carbon black, nigrosine dye, aniline blue, magnetites, and the like, as well as mixtures thereof. Colored pigments are also suitable for use with the present invention, including red, green, blue, brown, magenta, cyan, and yellow particles, as well as mixtures thereof, wherein the colored pigments are present in amounts that enable the desired color. Illustrative examples of suitable magenta pigments include 2,9-dimethyl-substituted quinacridone and anthraquinone dye, identified in the color index as Cl 60710, Cl Dispersed Red 15, a diazo dye identified in the color index as Cl 26050, Cl Solvent Red 19, and the like. Illustrative examples of suitable cyan pigments include copper tetra-4-(octadecyl sulfonamido) phthalocyanine, copper phthalocyanine pigment, listed in the color index as Cl 74160, Pigment Blue, and Anthradanthrene Blue, identified in the color index as Cl 69810, Special Blue X-2137, and the like. Illustrative examples of yellow pigments that may be selected include diarylide yellow 3,3-dichlorobenzidene acetoacetanilides, a monoazo pigment identified in the color index as Cl 12700, Cl Solvent Yellow 16, a nitrophenyl amine sulfonamide identified in the color index as Foron Yellow SE/GLN, Cl Dispersed Yellow 33, 2,5-dimethoxy-4-sulfonanilide phenylazo-4'-chloro-2,5-dimethoxy acetoacetanilide, Permanent Yellow FGL, and the like. Other suitable colorants include Normandy Magenta RD-2400 (Paul Uhlich), Paliogen Violet 5100 (BASF), Paliogen Violet 5890 (BASF), Permanent Violet VT2645 (Paul Uhlich), Heliogen Green L8730 (BASF), Argyle Green XP-111-S (Paul Uhlich), Brilliant Green Toner GR 0991 (Paul Uhlich), Heliogen Blue L6900, L7020 (BASF), Heliogen Blue D6840, D7080 (BASF), Sudan Blue OS (BASF), PV Fast Blue B2G01 (American Hoechst), Irgalite Blue BCA (Ciba-Geigy), Paliogen Blue 6470 (BASF), Sudan III (Matheson, Coleman, Bell), Sudan II (Matheson, Coleman, Bell), Sudan IV (Matheson, Coleman, Bell), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991K (BASF), Paliotol Yellow 1840 (BASF), Novoperm Yellow FG1 (Hoechst), Permanent Yellow YE 0305 (Paul Uhlich), Lumogen Yellow D0790 (BASF), Suco-Gelb L1250 (BASF), Suco-Yellow D1355 (BASF), Hostaperm Pink E (American Hoechst), Fanal Pink D4830 (BASF), Cinquasia Magenta (DuPont), Lithol Scarlet D3700 (BASF), Tolidine Red (Aldrich), Scarlet for Thermoplast NSD PS PA (Ugine Kuhlmann of Canada), E.D. Toluidine Red (Aldrich), Lithol Rubine Toner (Paul Uhlich), Lithol Scarlet 4440 (BASF), Bon Red C (Dominion Color Co.), Royal Brilliant Red RD-8192 (Paul Uhlich), Oracet Pink RF (Ciba-Geigy), Paliogen Red 3871 K (BASF), Paliogen Red 3340 (BASF), and Lithol Fast Scarlet L4300 (BASF). Colorants are typically present in the marking particles in an amount of from about 2 to about 20 percent by weight, although the amount can be outside this range.

Marking particles of the present invention can be used as toner particles for electrostatic latent imaging processes, and can be employed alone in single component development processes, or they can be employed in combination with carrier particles in two component development processes. Any suitable carrier particles can be employed with the toner particles. Typical carrier particles include granular zircon, steel, nickel, iron ferrites, and the like. Other typical carrier particles include nickel berry carriers as disclosed in U.S. Pat. No. 3,847,604, the disclosure of which is totally incorporated herein by reference. These carriers comprise nodular carrier beads of nickel characterized by surfaces of reoccurring recesses and protrusions that provide the particles with a relatively large external area. The diameters of the carrier particles can vary, but are generally from about 50 microns to about 1,000 microns, thus allowing the particles to possess sufficient density and inertia to avoid adherence to the electrostatic images during the development process.

Carrier particles can possess coated surfaces. Typical coating materials include polymers and terpolymers, including, for example, fluoropolymers such as polyvinylidene fluorides as disclosed in U.S. Pat. No. 3,526,533, U.S. Pat. No. 3,849,186, and U.S. Pat. No. 3,942,979, the disclosures of each of which are totally incorporated herein by reference. Coating of the carrier particles may be by any suitable process, such as powder coating, wherein a dry powder of the coating material is applied to the surface of the carrier particle and fused to the core by means of heat, solution coating, wherein the coating material is dissolved in a solvent and the resulting solution is applied to the carrier surface by tumbling, or fluid bed coating, in which the carrier particles are blown into the air by means of an air stream, and an atomized solution comprising the coating material and a solvent is sprayed onto the airborne carrier particles repeatedly until the desired coating weight is achieved. Carrier coatings may be of any desired thickness or coating weight. Typically, the carrier coating is present in an amount of from about 0.1 to about 1 percent by weight of the uncoated carrier particle, although the coating weight may be outside this range.

The toner is present in the two-component developer in any effective amount, typically from about 1 to about 5 percent by weight of the carrier, and preferably about 3 percent by weight of the carrier, although the amount can be outside these ranges.

Any suitable conventional electrophotographic development technique can be utilized to deposit toner particles of the present invention on an electrostatic latent image on an imaging member. Well known electrophotographic development techniques include magnetic brush development, cascade development, powder cloud development, electrophoretic development, and the like. Magnetic brush development is more fully described in, for example, U.S. Pat. No. 2,791,949, the disclosure of which is totally incorporated herein by reference; cascade development is more fully described in, for example, U.S. Pat. No. 2,618,551 and U.S. Pat. No. 2,618,552, the disclosures of each of which are totally incorporated herein by reference; and powder cloud development is more fully described in, for example, U.S. Pat. No. 2,725,305, U.S. Pat. No. 2,918,910, and U.S. Pat. No. 3,015,305, the disclosures of each of which are totally incorporated herein by reference.

The deposited toner image can be transferred to a receiving member such as paper or transparency material by any suitable technique conventionally used in electrophotography, such as corona transfer, pressure transfer, adhesive transfer, bias roll transfer, and the like. Typical corona transfer entails contacting the deposited toner particles with a sheet of paper and applying an electrostatic charge on the side of the sheet opposite to the toner particles. A single wire corotron having applied thereto a potential of between about 5000 and about 8000 volts provides satisfactory transfer.

After transfer, the transferred toner image can be fixed to the receiving sheet. The fixing step can be also identical to that conventionally used in electrophotographic imaging. Typical, well known electrophotographic fusing techniques include heated roll fusing, flash fusing, oven fusing, laminating, adhesive spray fixing, and the like.

Images printed with the marking particles of the present invention are photochromic in that they have a first state corresponding to a first absorption spectrum and a second state corresponding to a second absorption spectrum. Another embodiment of the present invention is directed to a process which comprises (a) generating an electrostatic latent image on an imaging member; (b) developing the latent image by contacting the imaging member with marking particles according to the present invention and containing a photochromic material having a first state corresponding to a first absorption spectrum and a second state corresponding to a second absorption spectrum; and (c) thereafter effecting a photochromic change in at least some of the photochromic material in the developed image from the first state to the second state. In a specific embodiment, the present invention is directed to a method of embedding and recovering machine readable information on a substrate which comprises (a) writing data in a predetermined machine readable code format on the substrate with photochromic marking particles according to the present invention having a first state corresponding to a first absorption spectrum and a second state corresponding to a second absorption spectrum, and (b) thereafter effecting a photochromic change in at least some of the photochromic marking particles from the first state to the second state, wherein a first portion of the photochromic marking particles is caused to shift from the first state to the second state and a second portion of the photochromic marking particles remains in the first state. In one of these embodiments, the photochromic marking particles in the second state subsequently are caused to undergo another photochromic change, thereby returning them to the first state. In another of these embodiments, the machine readable code format comprises a set of distinguishable symbols including a first symbol for encoding 0s and a second symbol for encoding 1s, wherein the symbols are written on a substantially constant center-to-center spacing. In yet another of these embodiments, the machine readable code format comprises a set of glyphs wherein each glyph corresponds to a digital value of bit length n and wherein the set comprises $2^n$ distinctive shapes. In still another of these embodiments, the glyphs are elongated along axes that are tilted at angles of plus and minus about 45° with respect to a horizontal axis to discriminate at least some of said digital values from each other.

The photochromic shift from the first state to the second state can be effected by any method suitable for the photochromic material. Examples of methods for inducing the photochromic shift include irradiation with radiation of a suitable wavelength, typically from about 190 to about 425 nanometers, although the wavelength can be outside this range. The reverse photochromic effect can be induced by irradiation with visible light, typically in the wavelength range of from about 425 to about 700 nanometers, although the wavelength can be outside this range, or by the application of heat.

The marking particles of the present invention can be used to print unnoticeable images on substrates such as paper or the like, such as logos, text, watermarks, or other markers. When the imaged substrate is exposed to light at from about 190 to about 425 nanometers, however, the spiropyran immediately undergoes a ring-opening to a strongly fluorescent red colored merocyanine form. In one embodiment, the marking particles of the present invention can be used to print an unnoticeable or unobtrusive mark superimposed with another clearly visible image such as a logo or text; the mark does not impair the readability of the logo or text image when the material is in the spiropyran form. Upon attempting to copy or scan the superimposed images, however, the light radiation from the copier or scanner convert the mark in the spiropyran form to the merocyanine form. The marks in the merocyanine form then appear as solid patches, thus rendering the superimposed logo or text image uncopyable.

The marking particles of the present invention can also be used to print embedded data. For example, by introducing into a color xerographic imaging machine containing the typical four toner cartridges of cyan, magenta, yellow, and black a fifth cartridge containing, for example, a second yellow toner that also contains the spiropyran, special marks, such as bar codes (bar-like codes and methods and apparatus for coding and decoding information contained therein are disclosed in, for example, U.S. Pat. No. 4,692,603, U.S. Pat. No. 4,665,004, U.S. Pat. No. 4,728,984, U.S. Pat. No. 4,728,783, U.S. Pat. No. 4,754,127, and U.S. Pat. No. 4,782,221, the disclosures of each of which are totally incorporated herein by reference) or "glyphs" as disclosed in, for example, U.S. Pat. No. 5,710,420, U.S. Pat. No. 5,128,525, U.S. Pat. No. 5,291,243, U.S. Pat. No. 5,168,147, U.S. Pat. No. 5,091,966, U.S. Pat. No. 5,051,779, U.S. Pat. No. 5,337,361, European Patent Application 469,864-A2, and European Patent Application 459,792-A2, the disclosures of each of which are totally incorporated herein by reference, can be introduced unnoticed into graphics, text, or other images to embed extra or coded information that becomes detectable either by a special scanner that interprets the information and translates it into human readable terms, or with ultraviolet light.

The marking particles of the present invention can also be used to generate electronically addressable displays. For example, the marking particles according to the present invention are applied uniformly to a substrate such as paper. The substrate has a blank appearance. An addressing wand is used to irradiate certain areas of the substrate with radiation, such as UV light, converting the irradiated areas from the colorless spiropyran form to the red merocyanine form, thereby causing the irradiated areas to appear red. For erasure of the markings, the entire substrate is irradiated with light of the appropriate wavelength for conversion of the red merocyanine form back to the colorless form. This embodiment constitutes a reflective, reimageable display. In another embodiment, the spiropyran is photochromically unstable over extended periods of time. Addressing of the substrate allows markings to remain visible only temporarily (for example, hours or days). Such temporary markings are useful in the protection of confidential information and in the area of secure documents.

The marking particles of the present invention can be applied to any desired substrate. Examples of suitable substrates include (but are not limited to) plain papers such as Xerox® 4024 papers, ruled notebook paper, bond paper, silica coated papers such as Sharp Company silica coated paper, Jujo paper, and the like, transparency materials, fabrics, textile products, plastics, polymeric films, inorganic substrates such as metals and wood, and the like.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

Preparation of Carboxylate and Sulfonate Substituted Spiropyran Salts

Step 1: Synthesis of 2,3,3-trimethylindolinium salts

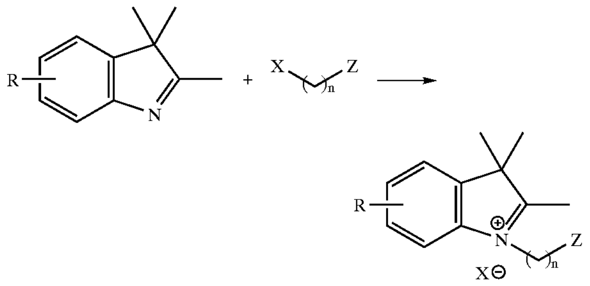

Because of the relatively weak nucleophilicity of 2,3,3-trimethylindolenine (where R is hydrogen) or its vinyl derivative 2,3,3,8-vinyl tryimethylindolenine (where R is vinyl), the syntheses of 2,3,3-trimethylindolinium salts were conducted either in the absence of any solvent or with a dipolar aprotic solvent (nitromethane) at 100° C.

Vinyl containing indolenine precursors can be prepared by Friedel-Crafts acylation of the precursors for the preparation of polymerizable spiropyrans. Alternatively, Friedel-Crafts acylation of the spiropyrans can be carried out. A general synthetic route to these materials is disclosed in, for example, G. K. Hamer, I. R. Peat, and W. F. Reynolds, "Investigations of Substituent Effects by Nuclear Magnetic Resonance Spectroscopy and All-Valence Electron Molecular Orbital Calculations. I. 4-Substituted Styrenes," *Can. J. Chem.*, Vol. 51, 897–914 (1973) and G. K. Hamer, I. R. Peat, and W. F. Reynolds, "Investigations of Substituent Effects by Nuclear Magnetic Resonance Spectroscopy and All-Valence Electron Molecular Orbital Calculations. II. 4-Substituted α-Methylstyrenes and α-t-Butylstyrenes," *Can. J. Chem., Vol.* 51, 915–926 (1973), the disclosures of each of which are totally incorporated herein by reference, and is outlined below.

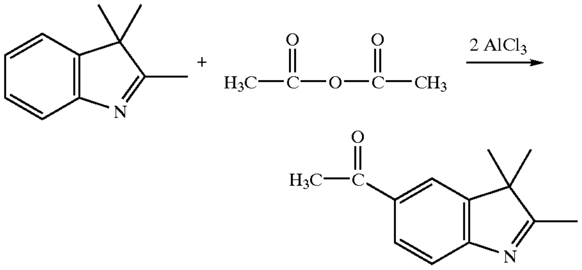

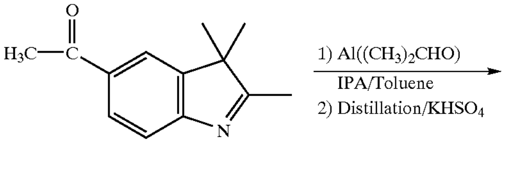

-continued

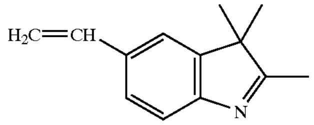

Alkylating agents that can be used in this reaction (all available from Aldrich Chemical Co., Milwaukee, Wis.) are 3-iodopropionic acid, ethyl 5-bromopentanoate, 6-bromohexanoic acid, 1,3-propylsulfone, and 1,4-butylsulfone. The choice of these reagents ensures that competing ring-formation and/or acid-base reactions are minimal to allow for nucleophilic attack of the sp2-N.

IA

Synthesis of N-(2-carboxyethyl)-2,3,3-trimethylindolinium Iodide

The general procedure for the preparation of the 2,3,3-trimethylindolinium salt intermediates is illustrated through the reaction of 2-iodopropionic acid and 2,3,3-trimethylindolenine. Vinyl containing intermediates can also be prepared from the N-(2-carboxyethyl)-2,3,3-trimethylindolinium iodide.

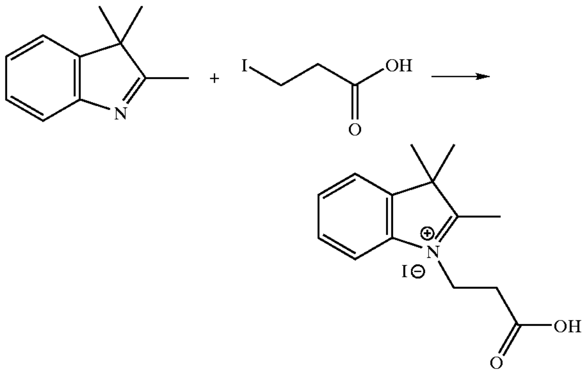

A 2-necked 50 milliliter round-bottomed flask equipped with a magnetic stirring bar and an argon inlet was charged with re-distilled (pressure 2 mm Hg, temperature 45° C.) 2,3,3-trimethylindolenine (7.95 grams, 50.0 mmol) and 3-iodopropionic acid (2.00 grams, 10 mmol). The mixture was heated to 80° C. for 12 hours, during which time the product precipitated out of solution and formed a highly viscous medium. Upon cooling, the reaction mixture was extracted three times with 200 milliliter portions of diethyl ether to remove all of the unreacted starting material. The remaining crystalline solid was then dissolved in 10 milliliters of water, extracted three times with 50 milliliter portions of diethyl ether, and extracted three times with 25 milliliter portions of $CHCl_3$. The aqueous layer was then removed and dried under vacuum (1.0 mm Hg) for 24 hours. The resulting amorphous solid was then recrystallized from toluene/$CHCl_3$ mixtures to produce the N-(2-carboxyethyl)-2,3,3-trimethylindolinium iodide product as 3.0 grams of a yellow solid (83.5 percent yield). $^1H$ and $^{13}C$ NMR spectra indicated the following:

$^1H$ NMR (400.1 MHz) in DMSO-$d_6$: δ7.97 (1H, m), 7.83 (1H, m), 7.59 (2H, m), 4.64 (2H, t, J=6, N—$CH_2$), 2.97 (2H, t, J=6, $CH_2CO$), 2.86 (3H, s, $CH_3$), 1.52 (6H, s, $CH_3$).

$^{13}C$ NMR (100.1 MHz) in DMSO-$d_6$: 198.0, 171.6, 141.8, 140.7, 129.5, 129.1, 123.7, 115.7, 54.4, 43.9, 31.3, 22.1, 15.0.

IB

Synthesis of N-(ethylpentanoyl)-2,3,3-trimethylindolinium Bromide

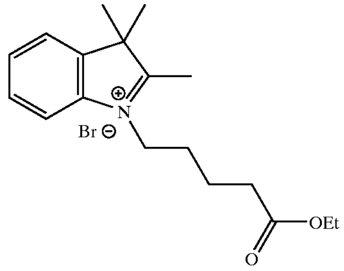

N-(ethylpentanoyl)-2,3,3-trimethylindolinium bromide was prepared by the process set forth in Example IA with 2,3,3-trimethylindolenine and ethyl 5-bromopentanoate to produce 2.65 grams (78 percent yield) of reddish-yellow crystals. $^{1}H$ and $^{13}C$ NMR spectra indicated the following:

$^{1}H$ NMR (400.1 MHz) in DMSO-$d_6$: δ8.02 (1H, m), 7.83 (1H, m), 7.61 (2H, m), 4.48 (2H, t, J=6, N—$CH_2$), 4.01 (2H, t, J=7, O—$CH_2$), 2.84 (3H, s, $CH_3$), 2.40 (2H, t, J=7, $CH_2CO$), 2.08 (4H, m, —$CH_2$), 1.53 (6H, s, $CH_3$), 1.13 (3H, t, J=7 Hz).

$^{13}C$ NMR (100.1 MHz) in DMSO-$d_6$: 197.0, 173.8, 172.3, 141.9, 141.2, 129.4, 128.9, 123.6, 115.3, 60.2, 54.3, 46.9, 30.3, 22.4, 22.0, 14.1.

IC

Synthesis of N-(5-carboxypentyl)-2,3,3-trimethylindolinium Bromide

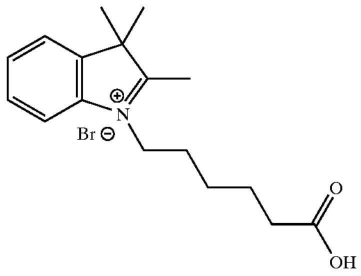

N-(5-carboxypentyl)-2,3,3-trimethylindolinium bromide was prepared by the process set forth in Example IA with 2,3,3-trimethylindolenine and 6-bromohexanoic acid to produce 2.43 grams (71.2 percent yield) of yellow crystals. $^{1}H$ and $^{13}C$ NMR spectra indicated the following:

$^{1}H$ NMR (400.1 MHz) in DMSO-$d_6$: δ7.98 (1H, m), 7.86 (1H, m), 7.60 (2H, m), 4.46 (2H, t, J=6, N—$CH_2$), 2.85 (3H, s, $CH_3$), 2.21 (2H, t, J=7, $CH_2CO$), 1.83 (2H, m, —$CH_2$), 1.52 (6H, s, $CH_3$), 1.46 (4H, s, —$CH_2$—).

$^{13}C$ NMR (100.1 MHz) in DMSO-$d_6$: 196.9, 174.7, 142.3, 141.5, 129.6, 129.4, 123.9, 115.9, 54.6, 47.9, 33.8, 27.4, 25.8, 24.5, 22.4, 14.6.

ID

Synthesis of 2.3.3-trimethylindolinium-N-propylsulfonate

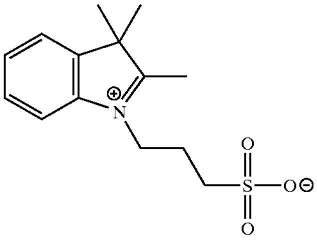

2,3,3-trimethylindolinium-N-propylsulfonate was prepared by the process set forth in Example IA with 2,3,3-trimethylindolenine and 1,3-propylsultone to produce 2.98 grams (94 percent yield) of white crystals. $^{1}H$ and $^{13}C$ NMR spectra indicated the following:

$^{1}H$ NMR (400.1 MHz) in DMSO-$d_6$: δ7.99 (1H, m), 7.77 (1H, m), 7.55 (2H, m), 4.60 (2H, t, J=7, N—$CH_2$), 2.78 (3H, s, $CH_3$), 2.61 (2H, t, J=7, $CH_2SO_3$—), 2.11 (2H, m, —$CH_2$—), 1.47 (6H, s, $CH_3$).

$^{13}C$ NMR (100.1 MHz) in DMSO-$d_6$: 196.9, 142.2, 141.5, 129.6, 129.2, 123.7, 115.7, 54.4, 47.7, 46.9, 24.0, 22.3, 14.1.

IE

Synthesis of 2.3.3-trimethylindolinium-N-butylsulfonate

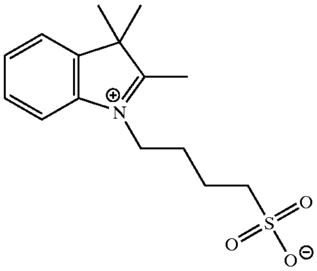

2,3,3-trimethylindolinium-N-butylsulfonate was prepared by the process set forth in Example IA with 2,3,3-trimethylindolenine and 1,4-butylsulfone to produce 2.86 grams (89.2 percent yield) of white crystals. $^{1}H$ and 13C NMR spectra indicated the following:

$^{1}H$ NMR (400.1 MHz) in DMSO-$d_6$: δ8.03 (1H, m), 7.82 (1H, m), 7.60 (2H, m), 4.48 (2H, t, J=7, N—$CH_2$), 2.85 (3H, s, $CH_3$), 2.49 (2H, m, $CH_2SO_3$—), 1.97 (2H, m, —$CH_2$—), 1.76 (2H, m, —$CH_2$—) 1.53 (6H, s, $CH_3$).

$^{13}C$ NMR (100.1 MHz) in DMSO-$d_6$: 196.9, 142.2, 141.5, 129.6, 129.2, 123.7, 115.7, 54.4, 47.7, 46.9, 24.0, 22.8, 22.3, 14.1.

EXAMPLE II

Preparation of Carboxylate Substituted Spiropyran Salts

Step 2: Synthesis of 6-nitro-benzoindolino spiropyrans (BIPS)

In the presence of a base, the functionalized salts were converted to an activated Fischer Base capable of undergoing a condensation reaction with 5-nitrosalicaldehyde. The solvent used in this reaction was ethanol, since the majority of spiropyrans are only partially soluble in this medium.

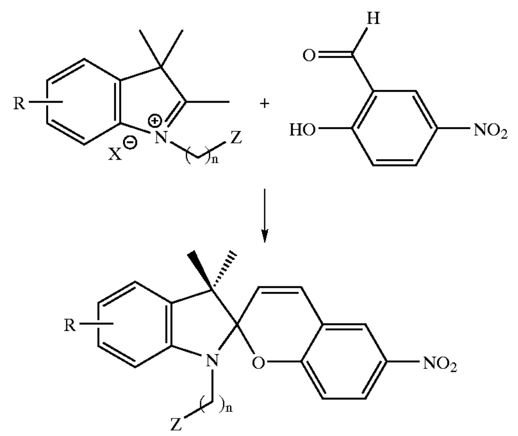

IIA

Synthesis of 6-Nitro-N-(2-carboxyethyl) spirobenzoindolinopyran

The general procedure for the preparation of the spiropyrans is illustrated through the condensation of 2-carboxyethyl-2,3,3-trimethylindolinium iodide with 5-nitrosalicaldehyde in the presence of a base, triethylamine.

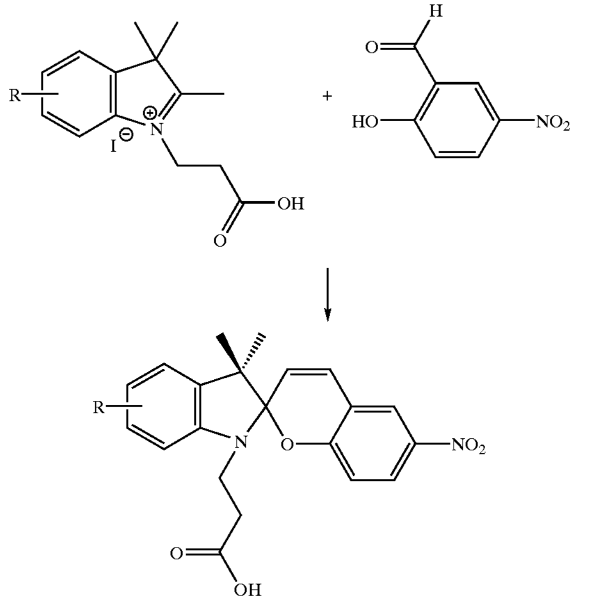

Into a 50 milliliter round-bottomed flask equipped with a water condenser topped with a pressure-equalized dropping funnel was added 2-carboxyethyl-2,3,3-trimethylindolinium iodide (prepared as described in Example IA; 1.0 gram, 2.78 mmol) and 5-nitrosalicaldehyde (0.50 gram, 3.0 mmol). Ethanol was added until the solids dissolved at reflux temperature, followed by addition of triethylamine (0.280 gram, 2.78 mmol) in 5 milliliters of ethanol via the dropping funnel over 20 minutes. Addition of the base resulted in an immediate color change to purple, signifying that spiropyran formation was occurring. The mixture was refluxed for 6 hours and then cooled to room temperature. The volume was concentrated to 5 milliliters before cooling the flask to 0° C. in a refrigerator for 24 hours. The spiropyran precipitate was filtered under vacuum and recrystallized from ethanol to give yellow crystals of 6-nitro-N-(2-carboxyethyl) spirobenzoindolinopyran, yield 0.763 grams (72.2 percent), melting point 192–194° C. $^1$H NMR, $^{13}$C NMR, IR, and UV-visible spectra indicated the following:

$^1$H NMR (400.1 MHz) in DMSO-$d_6$: δ8.21 (1H, d, J=3), 8.00 (1H, d, J=9), 7.21 (1H, d, J=10.5), 7.11 (2H, m), 6.87 (2H, m), 6.67 (1H, d, J=7.8), 6.00 (1H, d, J=10.5), 3.42 (2H, J=6, N—$CH_2$), 2.50 (2H, t, J=6, $CH_2CO$), 1.18 (3H, s, $CH_3$), 1.07 (3H, s, $CH_3$). $^{13}$C NMR (100.1 MHz) in DMSO-$d_6$: 173.7, 159.9, 146.9, 141.3, 136.5, 129.0, 128.5, 126.5, 123.6, 122.6, 120.1, 119.7, 116.3, 107.5, 107.3, 53.5, 34.0, 26.4, 20.3. IR (KBr, $cm^{-1}$): 3030, 3000, 2971, 1709, 1654, 1610, 1575, 1510, 1483, 1457, 1441, 1360, 1330, 1270, 1141, 1088, 1020, 915, 803. UV-Visible (DMSO, $\lambda_{max}$ (ε)): 336 nm, 9,600 $M^{-1}cm^{-1}$. Elemental analysis: Calculated for $C_{21}H_{20}O_5N_2$: C, 65.30; H, 5.26; N, 7.30. Found: C, 64.96; H, 5.23; N, 7.22.

IIB

Synthesis of 6-Nitro-(N-ethylpentanoyl) spirobenzoindolinopyran

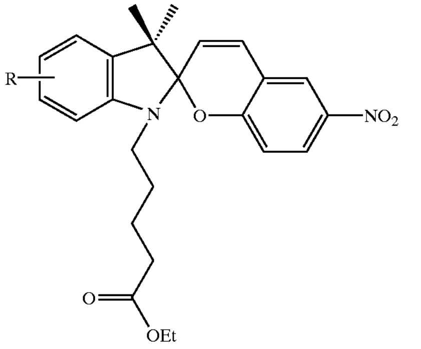

6-Nitro-(N-ethylpentanoyl)spirobenzoindolinopyran was prepared by the process set forth in Example IIA with 5-nitrosalicaldehyde and N-(ethylpentanoyl)-2,3,3-trimethylindolinium bromide (prepared as described in Example IB). $^1$H NMR spectra indicated the following:

$^1$H NMR (400.1 MHz) in $CDCl_3$: δ7.99 (2H, m), 7.15 (1H, t), 7.06 (1H, d), 6.86 (2H, t), 6.72 (1H, d), 6.60 (1H, t), 5.85 (1H, d), 4.08 (2H, q, O—$CH_2$), 3.17 (2H, t), 2.39 (2H, $CH_2CO$), 2.00 (4H, m, —$CH_2$), 1.22 (9H, m, $CH_3$).

Deprotection of the Chelating Functionality

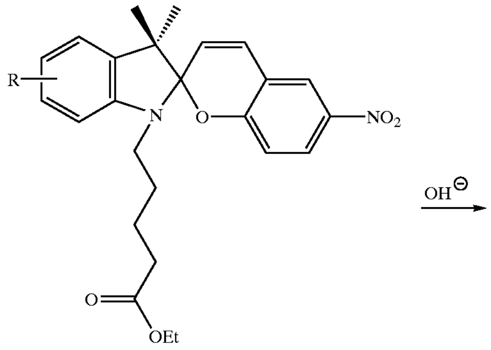

-continued

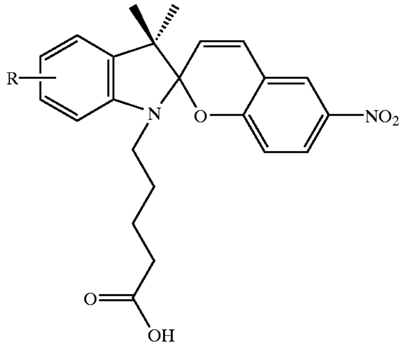

To a 50 milliliter round-bottomed flask equipped with a magnetic stir bar and an argon inlet was added finely ground 6-nitro-(N-ethylpentanoate)spirobenzoindolinopyran (1.0 gram, 2.28 mmol) and dissolved in 10 milliliters of THF. Sodium hydroxide (25 milliliters of a 1 Molar solution) was added to the solution and stirred for 24 hours before rotary evaporation at room temperature under high vacuum. The solids were dissolved in a minimum amount of water and the product was precipitated through neutralization with 1 Molar hydrochloric acid. Vacuum filtration isolated the solid, which was recrystallized from ethanol to yield 0.962 gram of yellow-red crystals of 6-nitro-(N-4-carboxylbutyl) spirobenzoindolinopyran (94 percent yield), melting point 139–141° C. $^1$H NMR, $^{13}$C NMR, IR, and UV-visible spectra indicated the following:

$^1$H NMR (400.1 MHz) in DMSO-$d_6$: δ8.19 (1H, d, J=2.8), 7.97 (1H, d, J=9.0), 7.19 (1H, d, J=10.4), 7.08 (2H, m), 6.84 (1H, d, J=7.2), 6.76 (1H, t, J=7.2), 6.57 (1H, d, J=7.8), 5.98 (1H, d, J=10.4), 3.10 (2H, m, N—$CH_2$), 2.16 (2H, t, J=6.8, $CH_2CO$), 1.55 (4H, m, —$CH_2$—), 1.18 (3H, s, $CH_3$), 1.09 (3H, s, $CH_3$). $^{13}$C NMR: 174.4, 159.2,146.7, 140.4, 135.6, 128.1, 127.6, 125.7, 122.8, 121.6, 118.9, 118.7, 115.4, 106.4, 52.2, 33.5, 28.0, 26.1, 24.2, 19.5. IR (cm$^{-1}$): 3030, 3000, 2971, 1709, 1654, 1610, 1575, 1510, 1483, 1457, 1441, 1360, 1330, 1270, 1141, 1088, 1020, 915, 803. UV-Visible (DMSO, $\lambda_{max}$ (ε)): 338 nm, 7,800 M$^{-1}$cm$^{-1}$. Elemental analysis: Calculated for $C_{23}H_{24}O_5N_2$: C, 67.61; H, 5.89; N, 6.82. Found: C, 67.31; H, 5.92; N, 6.60.

IIC

Synthesis of 6-nitro-N-(5-carboxypentyl) spirobenzoindolinopyran

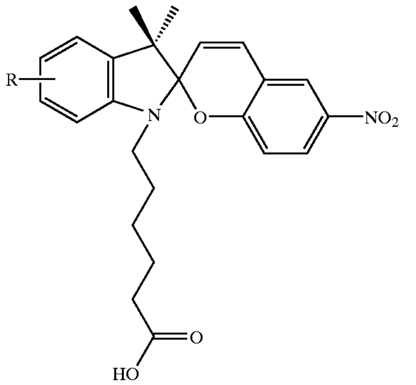

6-nitro-N-(5-carboxypentyl)spirobenzoindolinopyran was prepared by the process set forth in Example IIA with 5-nitrosalicaldehyde and N-(5-carboxypentyl)-2,3,3-trimethylindolinium bromide (prepared as described in Example IC) to produce 1.23 grams (48 percent yield) of yellow-red crystals, melting point 80–82° C. $^1$H NMR, $^{13}$C NMR, IR, and UV-visible spectra indicated the following:

$^1$H NMR (400.1 MHz) in DMSO-$d_6$: δ8.19 (1H, d, J=3.2), 8.00 (1H, d, J=9.0), 7.21 (1H, d, J=10.5), 7.08 (2H, m), 6.80 (2H, m), 6.57 (1H, d, J=7.8), 5.98 (1H, d, J=10.5), 3.10 (2H, m, N—$CH_2$), 2.13 (2H, m, $CH_2CO$), 1.45 (4H, m, —$CH_2$—), 1.20 (2H, m, —$CH_2$—), 1.18 (3H, s, $CH_3$), 1.07 (3H, s, $CH_3$). $^{13}$C NMR: 174.4, 159.2, 146.7, 140.4, 135.6, 128.1, 127.6, 125.7, 122.8, 121.6, 118.9, 118.7, 115.4, 106.4, 52.2, 33.5, 28.0, 26.1, 25.8, 24.2, 19.5. IR (cm$^{-1}$): 3030, 3000, 2971, 1709, 1654, 1610, 1575, 1510, 1483, 1457, 1441, 1360,1330, 1270, 1141, 1088, 1020, 915, 803. UV-Visible (DMSO, $\lambda_{max}$ (ε)): 342 nm, 8,400 M$^{-1}$cm$^{-1}$. Elemental analysis: Calculated for $C_{24}H_{25}O_5N_2$: C, 68.20; H, 6.16; N, 6.70. Found: C, 68.30; H, 6.09; N, 6.52.

Step 3: Preparation of Carboxylate Salts

Preparation of the carboxylate salts entailed the treatment of an alcoholic solution of the spiropyran with about 1 molar equivalent of NaOEt or KOEt. A representative procedure is described through the reaction of 6-nitro-(N-carboxyethyl) spirobenzoindolinopyran with NaOEt:

IID

Synthesis of 6-Nitro-spirobenzoindolinopyran-N-ethylsodiumcarboxylate

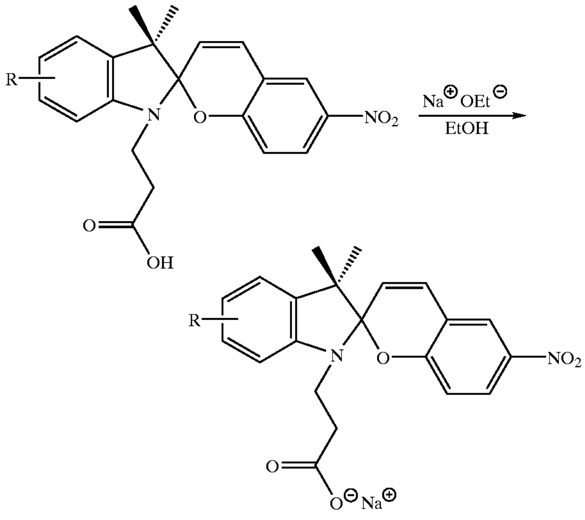

In a 50 milliliter round-bottomed flask equipped with a magnetic stir bar and an argon inlet was added finely ground 6-nitro-(N-carboxyethyl)spirobenzoindolinopyran (0.100 gram, 0.263 mmol) prepared as described in Example IIA and dissolved in 5 milliliters of ethanol. The mixture was then cooled to 0° C. in an ice bath before adding through a syringe 3.0 milliliters of an 8.64x10$^{-2}$ Molar NaOEt (0.265 mmol) solution. The reaction was stirred for 3 hours before rotary evaporation at room temperature under high vacuum. Recrystallization from ethanol gave 100 milligrams of yellow-red crystals of 6-nitro-spirobenzoindolinopyran-N-ethylsodiumcarboxylate (94.6 percent yield), melting point 202–204° C. $^1$H NMR, $^{13}$C NMR, IR, and UV-visible spectra indicated the following:

$^1$H NMR (400.1 MHz) in DMSO-$d_6$: δ8.17 (1H, d, J=2.8), 7.96 (1H, d, J=9.0), 7.15 (1H, d, J=10.5), 7.07 (2H, m), 6.83 (1H, d, J=9), 6.73 (1H, t, J=7.3), 6.58 (1H, d, J=8.0), 5.98 (1H, d, J=10.5), 3.23 (2H, m, N—$CH_2$), 2.19 (2H, m, $CH_2CO$), 1.16 (3H, s, $CH_3$), 1.05 (3H, s, $CH_3$). $^{13}$C NMR:

173.3, 159.2, 146.5, 140.3, 135.5, 127.7, 127.5, 125.5, 122.6, 122.0, 121.4, 118.8, 118.6, 115.3, 106.5, 106.4, 52.2, 36.2, 25.7, 19.5. IR ($cm^{-1}$): 3020, 2970, 2923, 1652, 1607, 1588, 1507, 1480, 1450, 1330, 1275, 1218, 1156, 1123, 1090, 1020, 910, 803. UV-Visible (DMSO, $\lambda_{max}$ ($\epsilon$)): 338 nm, 8,400 $M^{-1}cm^{-1}$. Elemental analysis (High resolution mass spectrometer (HRMS), fast atom bombardment with positive ions (FAB+)): Calculated for $C_{21}H_{21}O_5N_2$: 381.1451. Found: 381.1399.

IIE

Synthesis of 6-Nitrospirobenzoindolinopyran-N-butylpotassiumcarboxylate

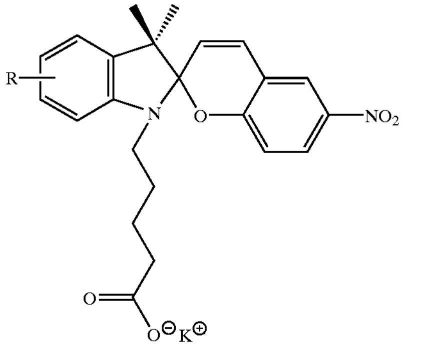

6-Nitrospirobenzoindolinopyran-N-butylpotassium carboxylate was prepared by the process set forth in Example IID with 6-nitro-(N-ethylpentanoyl)spirobenzoindolinopyran (prepared as described in Example IIB) to produce 0.94 gram of red crystals (94 percent yield), melting point 180–182° C. $^1$H NMR, $^{13}$C NMR, IR, and UV-visible spectra indicated the following:

$^1$H NMR (400.1 MHz) in DMSO-$d_6$: δ8.18 (1H, d, J=2.6), 7.97 (1H, d, J=9.0), 7.18 (1H, d, J=10.5), 7.10 (2H, m), 6.85 (1H, d, J=9), 6.74 (1H, t, J=7.3), 6.57 (1H, d, J=7.8), 5.98 (1H, d, J=10.5), 3.49 (1H, m, N—CH), 3.05 (1H, m, N—CH), 1.81 (2H, m, $CH_2CO$), 1.32 (2H, m, —$CH_2$—), 1.20 (2H, m, —$CH_2$—), 1.1 (3H, s, $CH_3$), 1.07 (3H, s, $CH_3$). $^{13}$C NMR: 174.4, 159.2, 146.7, 140.4, 135.6, 128.1, 127.6, 125.7, 122.8, 121.6, 118.9, 118.7, 115.4, 106.6, 106.4, 52.2, 42.7, 28.0, 26.1, 25.8, 19.5. IR ($cm^{-1}$): 3020, 2970, 2923, 1652, 1607, 1588, 1507, 1480, 1450, 1330, 1275, 1218, 1156, 1123, 1090, 1020, 910, 803. UV-Visible (DMSO, $\lambda_{max}$ ($\epsilon$)): 342 nm, 8,400 $M^{-1}cm^{-1}$. Elemental analysis (HRMS (FAB+)): Calculated for $C_{23}H_{24}O_5N_2K$: 447.2677 Found: 447.2688.

IIF

Synthesis of 6-Nitrospirobenzoindolinopyran-N-pentylpotassium Carboxylate

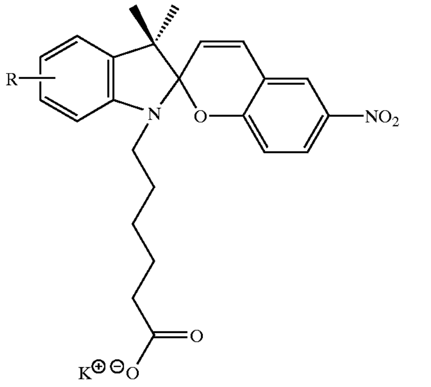

6-Nitrospirobenzoindolinopyran-N-pentylpotassium carboxylate was prepared by the process set forth in Example IID with 6-nitro-N-(5-carboxypentyl) spiro benzoindolinopyran (prepared as described in Example IIC) to produce 0.54 grams (73 percent yield) of dark red 6-nitrospirobenzoindolinopyran-N-pentyl potassium carboxyl ate crystals, melting point 100–102° C. $^1$H NMR, $^{13}$ NMR, IR, and UV-visible spectra indicated the following:

$^1$H NMR (400.1 MHz) in DMSO-$d_6$: δ8.17 (1H, d, J=2.8), 7.97 (1H, d, J=9.0), 7.18 (1H, d, J=10.5), 6.84 (2H, m), 6.84 (1H, d, J=9), 6.77 (1H, t, J=7.6), 6.55 (1H, d, J=7.8), 5.98 (1H, d, J=10.5), 3.10 (2H, m, N—$CH_2$) 1.79 (2H, m, $CH_2CO$), 1.45 (4H, m, —$CH_2$—), 1.20 (2H, m, —$CH_2$—), 1.18 (3H, s, $CH_3$), 1.05 (3H, s, $CH_3$). $^{13}$C NMR: 174.4, 159.2, 146.7, 140.4, 135.6, 128.1, 127.6, 125.7, 125.2, 122.8, 121.8, 118.8, 118.7, 115.4, 106.4, 52.2, 43.0, 33.5, 28.0, 26.1, 25.8, 24.2, 19.5, 14.1. IR ($cm^{-1}$): 3020, 2970, 2923, 1652, 1607, 1588, 1507, 1480, 1450, 1330, 1275, 1218, 1156, 1123, 1090, 1020, 910, 803. UV-Visible (DMSO, $\lambda_{max}$ ($\epsilon$)): 342 nm, 8,400 $M^{-1}cm^{-1}$. Elemental analysis (HRMS (FAB+)): Calculated for $C_{24}H_{25}O_5N_2K$: 461.2424. Found: 461.2445.

EXAMPLE III

Preparation of Sulfonate Substituted Spiropyran Salts

Step 2: Synthesis of 6-nitro-benzoindolino spiropyrans (BIPS)

IIIA

Synthesis of 6-Nitro-spirobenzoindolinopyran-N-propyl-triethylammoniumsulfonate

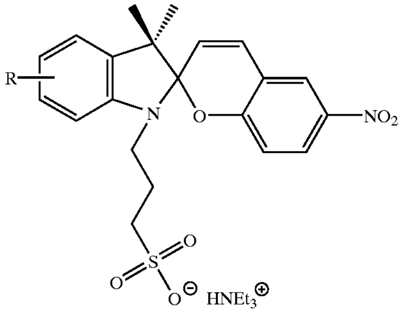

6-Nitro-spirobenzoindolinopyran-N-propyl-triethyl ammoniumsulfonate was prepared by the process set forth in Example IIA with 5-nitrosalicaldehyde and 2,3,3-trimethylindolinium-N-propylsulfonate (prepared as described in Example ID). The product was recrystallized from ethyl acetate to produce 1.43 grams (52 percent yield) of yellow crystals, melting point 188–190° C. $^1$H NMR, $^{13}$C NMR, IR, and UV-visible spectra indicated the following:

$^1$H NMR (400.1 MHz) in DMSO-$d_6$: δ8.27 (1H, d, J=2.8), 8.04 (1H, d, J=9.0), 7.26 (1H, d, J=10.4), 7.15 (2H, m), 6.83 (3H, m), 6.03 (1H, d, J=10.4), 3.29 (2H, t, J=7.3, N—$CH_2$), 3.13 (6H, q, J=7.3, $CH_2CH_3$), 2.50 (2H, m, $CH_2SO_3$) 1.49 (2H, m, —$CH_2$—), 1.25 (9H, t, $CH_3$), 1.19 (3H, s, $CH_3$), 1.16 (3H, s, $CH_3$). $^{13}$C NMR: 159.2, 146.7, 140.4, 135.5, 128.1, 127.6, 125.7, 122.8, 121.6, 121.5, 118.9, 118.7, 115.4, 106.4, 106.4, 52.2, 49.0, 45.7, 42.2, 24.7, 19.5, 8.55. IR ($cm^{-1}$): 3020, 2970, 2684, 2510, 1652, 1607, 1510, 1483, 1457, 1333, 1275, 1218, 1156, 1123, 1089, 1020, 916, 805. UV-Visible (DMSO, $\lambda_{max}$ ($\epsilon$)): 342 nm, 8,600 $M^{-1}cm^{-1}$. Elemental analysis: Calculated for $C_{27}H_{37}O_6N_3S$: C, 61.05; H, 6.70; N, 7.90; S, 5.94. Found: C, 61.30; H, 6.67; N, 7.83; S, 5.86.

IIIB

Synthesis of 6-Nitro-spirobenzoindolinopyran-N-butyl-triethylammoniumsulfonate

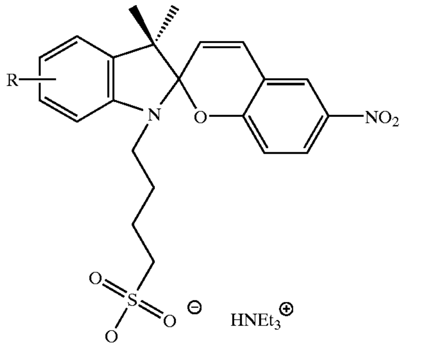

6-nitro-spirobenzoindolinopyran-N-butyl-triethylammonium sulfonate was prepared by the process set forth in Example IIA with 5-nitrosalicaldehyde and 2,3,3-trimethylindolinium-N-butylsulfonate (prepared as described in Example IE). The product was recrystallized from ethyl acetate to produce 0.86 gram (36 percent yield) of purple crystals, melting point 208–210° C. $^1$H NMR, $^{13}$C NMR, IR, and UV-visible spectra indicated the following:

$^1$H NMR (400.1 MHz) in DMSO-$d_6$: δ8.27 (1H, d, J=2.8), 8.04 (1H, d, J=9.0), 7.26 (1H, d, J=10.4), 7.15 (2H, m), 6.83 (3H, m), 6.03 (1H, d, J=10.4), 3.29 (2H, t, J=7.3, N—$CH_2$), 3.13 (6H, q, J=7.3, $CH_2CH_3$), 2.50 (2H, m, $CH_2SO_3$) 1.49 (4H, m, —$CH_2$—), 1.25 (9H, t, $CH_3$), 1.19 (3H, s, $CH_3$), 1.16 (3H, s, $CH_3$). $^{13}$C NMR: 159.2, 146.7, 140.4, 135.6, 128.1, 127.6, 125.7, 122.8, 121.6, 118.9, 118.7, 115.4, 106.4, 59.7, 52.2, 42.5, 33.3, 28.0, 25.8, 24.2, 22.1, 19.5, 14.0. IR ($cm^{-1}$): 3020, 2970, 2684, 2510, 1652, 1607, 1510, 1483, 1457, 1333, 1275, 1218, 1156, 1123, 1089, 1020, 916, 805. UV-Visible (DMSO, $\lambda_{max}$ (ε)): 344 nm, 9,000 $M^{-1}cm^{-1}$. Elemental analysis: Calculated for $C_{28}H_{39}O_6N_3S$: C, 59.70; H, 6.90; N, 7.52; S, 5.70. Found: C, 59.64; H, 6.84; N, 7.43; S, 5.62.

EXAMPLE IV

Semicontinuous Latex Preparation

A vinyl spiropyran of the formula

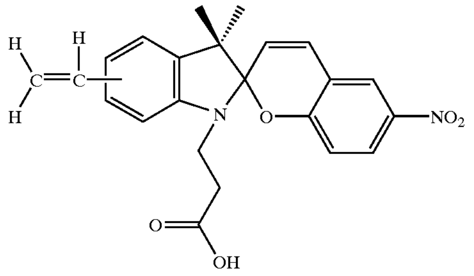

is prepared by the method of Example IIA. A latex emulsion comprising polymer particles generated from the emulsion polymerization of styrene, butyl acrylate, vinyl spiropyran, and β-carboxyethyl acrylate is prepared as follows. A surfactant solution of 22.21 grams of ABEX 2010 (anionic/nonionic mixture emulsifier available from Rhone-Poulenc) and 411.3 grams of deionized water is prepared by mixing the ingredients for 10 minutes in a stainless steel holding tank. The holding tank is then purged with nitrogen for 5 minutes before transferring into the reactor. Thereafter, the reactor is continuously purged with nitrogen while being stirred at 100 RPM. The reactor is then heated up to 80° C. at a controlled rate and maintained at that temperature.

Separately, 6.66 grams of ammonium persulfate initiator are dissolved in 33.7 grams of deionized water.

Separately, the monomer emulsion is prepared in the following manner: 321 grams of styrene, 100 grams of butyl acrylate, 22.53 grams of vinyl spiropyran, 6.7 grams of acrylic acid, 4.12 grams of 1-dodecanethiol, 3.0 kilograms of water, 22.2 grams of ABEX 2010 (anionic/nonionic surfactant; Rhone-Poulenc), and 190 grams of deionized water are mixed to form an emulsion. Five percent of the emulsion thus formed is then slowly fed into the reactor containing the aqueous surfactant phase at 80° C. to form the "seeds" while being purged with nitrogen. The initiator solution is then slowly charged into the reactor and after 10 minutes the rest of the emulsion is continuously fed in using metering pumps.

After the monomer emulsion is charged into the main reactor, the temperature is held at 80° C. for an additional 2 hours to complete the reaction. The reactor contents are then cooled down to room temperature, about 25° C., to about 35° C. It is believed that the product will comprise 40 percent of 600 nanometer diameter resin particles of styrene/butylacrylate/spiropyran/β-carboxyethyl acrylate suspended in aqueous phase containing surfactant which is collected into a holding tank. It is believed that the resin molecular properties resulting from this latex will be weight average molecular weight ($M_w$) of 62,000, number average molecular weight ($M_n$) of 11.9, and a midpoint glass transition temperature ($T_g$) of 58.0° C.

EXAMPLE V

Aggregation of Cyan Marking Particles 390.0 Grams of the latex emulsion prepared as described in Example IV containing spiropyran and 197 grams of an aqueous cyan pigment dispersion containing 7.6 grams of cyan pigment 15.3 (available from BASF) with a solids loading of 53.4 percent are simultaneously added to 600 milliliters of water with high shear stirring by means of a polytron. To this mixture is added 20.3 grams of calcium chloride and 7.2 grams of a polyaluminum chloride (PAC) solution (containing 1.2 grams of a concentrated PAC solution containing 10 percent by weight PAC solids) and 6.0 grams of 0.2 molar nitric acid over a period of 1 minute, followed by the addition of 11.3 grams of a cationic surfactant solution containing 1.3 grams of SANIZOL® B (cationic surfactant benzalkonium chloride; 60 percent by weight active ingredients; available from Kao Chemicals), and 10 grams of deionized water and blending at a speed of 5,000 rpm for a period of 2 minutes. The mixture is then transferred to a 2 liter reaction vessel and heated at a temperature of 50° C. for 100 minutes, resulting in an aggregate size of 5.8 microns and a particle size distribution GSD of 1.19. The pH of the mixture is then adjusted from 2.0 to 7.5 by the addition of an aqueous base solution of 4 percent by weight sodium hydroxide followed by stirring for an additional 15 minutes. Subsequently, the resulting mixture is heated to 85° C. and maintained at that temperature for a period of 1 hour before changing the pH to 4.6 by the addition of 5 percent by weight nitric acid. The temperature is then maintained at 85° C. for an additional 1 hour, after which the temperature is raised to 90° C. and maintained at that temperature for 3 hours before cooling down to room temperature (about 25° C.). The resulting slurry pH is then further adjusted to 11.0 by the addition of a base solution of 5.0 percent by weight sodium hydroxide, followed by stirring for 1 hour, followed by filtration and reslurrying of the resulting wet cake in 1 liter of water. The process of adjusting the pH is carried out 2 more times, followed by 2 water washes and drying in a freeze dryer. It is believed that the final product will comprise 96.25 percent by weight of the polymer latex prepared in Example IV and 3.75 percent by weight of pigment with a marking particle size of 6.1 microns in volume average diameter and a particle size distribution of 1.21, both as measured on a Coulter Counter. It is believed that the morphology will be of a potato shape as determined by scanning electron microscopy. It is believed that the marking particle tribo charge as determined by the Faraday Cage method throughout will be −32.2 microcoulombs per gram at 20 percent relative humidity and −14.9 microcoulombs per gram at 80 percent relative humidity, measured on a carrier with a core of a ferrite, about 90 microns in diameter, with a coating of polymethylmethacrylate having dispersed therein carbon black in an amount of about 20 percent by weight of the carrier coating.

EXAMPLE VI

Aggregation of Cyan Marking Particles

310 Grams of the latex emulsion prepared in Example IV containing vinyl spiropyran, 197 grams of an aqueous cyan pigment dispersion containing 16 grams of cyan pigment 15.3 (available from BASF) with a solids loading of 53.4 percent, and 48 grams of the polyethylene wax dispersion P725 wax having a solids loading of 30 weight percent (available from Petrolite Chemicals) are simultaneously added to 600 milliliters of water with high shear stirring by means of a polytron. To this mixture is added 19.8 grams of zinc chloride and 20 grams of a polyaluminum chloride (PAC) solution (containing 3.2 grams of a concentrated PAC solution containing 10 percent by weight PAC solids) and 16.8 grams of 0.2 molar nitric acid over a period of 1 minute, followed by blending at a speed of 5,000 rpm for a period of 2 minutes. The resulting mixture is transferred to a 2 liter reaction vessel and heated at a temperature of 50° C. for 130 minutes, resulting in an aggregate size of 5 microns and a particle size distribution GSD of 1.20. To this marking particle aggregate are added 80 grams of the polymer latex prepared in Example IV, followed by stirring for an additional 30 minutes, after which the particle size is about 5.3 with a GSD of 1.20. The pH of the resulting mixture is then adjusted from 2 to 8 by the addition of an aqueous base solution of 4 percent by weight sodium hydroxide followed by stirring for an additional 15 minutes. Subsequently, the resulting mixture is heated to 85° C. and maintained at that temperature for a period of 1 hour before changing the pH to 4.6 by the addition of 5 percent by weight nitric acid. The temperature is then maintained at 85° C. for an additional 1 hour, after which the temperature is raised to 90° C. After 30 minutes at 90° C. the pH of the mixture is further reduced to 3.5 by the addition of nitric acid and the temperature is maintained at 90° C. for an additional 2.5 hours, resulting in a particle size of 5.4 microns and a GSD of 1.21, after which the reactor contents are cooled down to room temperature (about 25° C.). The resulting slurry pH is then further adjusted to 10 by the addition of a base solution of 5 percent by weight sodium hydroxide, followed by stirring for 1 hour at a temperature of 65° C., followed by filtration and reslurrying of the resulting wet cake in 1 liter of water and stirring for 1 hour at 40° C. A further wash at a pH of 4.0 (nitric acid) at 40° C. is then carried out, followed by two more water washings at a temperature of 40° C. It is believed that the final marking particle product, after drying in a freeze dryer, will comprise 87.3 percent by weight of the polymer latex prepared in Example IV, 4.7 percent by weight of pigment, and 8 percent by weight of the wax. It is believed that the marking particle size will be about 5.5 microns in volume average diameter with a particle size distribution of 1.20, both as measured on a Coulter Counter. It is believed that the morphology will be spherical in shape as determined by scanning electron microscopy. It is believed that the marking particle tribo charge will be −60 microcoulombs per gram at 20 percent relative humidity and −10 microcoulombs per gram at 80 percent relative humidity, measured on a 35 micron carrier with a core of ferrite and a coating of polymethylmethacrylate and carbon black.

EXAMPLE VII

Marking particles are prepared by the process described in Example V except that no pigment is used. The resulting marking particles are substantially colorless.

EXAMPLE VIII

Marking particles are prepared by the process described in Example VI except that no pigment is used. The resulting marking particles are substantially colorless.

EXAMPLE IX

A developer composition is prepared by mixing 3 grams of the marking particles prepared in Example V with 97 grams of the carrier particles described in Example V. The developer is then incorporated into an electrophotographic imaging device, followed by forming latent images, developing the latent images with the developer, transferring the developed images to substrates such as paper of transparency material, and fusing the developed images by application of heat, thereby forming cyan images on the substrates.

Developers are prepared with the same carrier by the same method for the marking particles prepared in Examples VI, VII, and VIII, and the developers are used to generate cyan (Example VI) or substantially colorless (Examples VII and VIII) images by the same method.

EXAMPLE X

The developed substantially colorless images formed in Example IX are exposed to actinic radiation at wavelengths of from about 190 to about 425 nanometers, thereby causing the images to appear red. Subsequently, the red images are exposed to actinic radiation at wavelengths of from about 425 to about 700 nanometers, thereby causing the images to return to a substantially colorless appearance.

The developed cyan images formed in Example IX are exposed to actinic radiation at wavelengths of from about 190 to about 425 nanometers, thereby causing the images to appear more red in color. Subsequently, the images are exposed to actinic radiation at wavelengths of from about 425 to about 700 nanometers, thereby causing the images to return to the original cyan appearance.

EXAMPLE XI

Marking particles prepared as described in Example VII are applied uniformly to a sheet of XEROX® 4024 plain paper and affixed thereto with heat and pressure by passing the paper through the fusing module of an electrophotographic imaging apparatus. The resulting addressable display is substantially colorless in appearance. Thereafter, an addressing wand is used to irradiate certain areas of the substrate with light at wavelengths of from about 190 to about 425 nanometers, converting the irradiated areas from the colorless spiropyran form to the red merocyanine form, thereby causing the irradiated areas to appear red. Subsequently, the red images are erased by irradiating the substrate with light at wavelengths of from about 425 to about 700 nanometers.

A similar addressable display is prepared with the marking particles prepared as described in Example VIII. It is believed that substantially similar results will be obtained.

Other embodiments and modifications of the present invention may occur to those of ordinary skill in the art subsequent to a review of the information presented herein; these embodiments and modifications, as well as equivalents thereof, are also included within the scope of this invention.

What is claimed is:

1. An addressable display comprising a substrate having uniformly situated thereon a coating of marking particles which comprise a resin, a chelating agent, and a spiropyran material which is of the formula

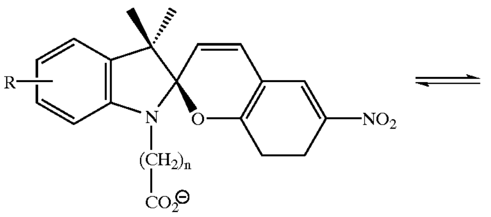

-continued

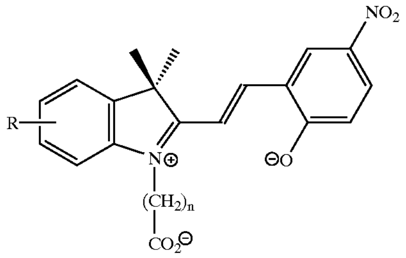

or

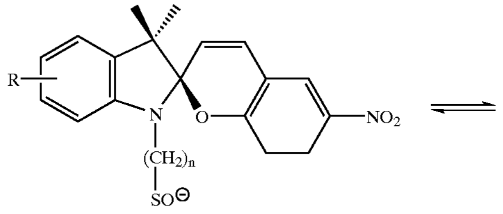

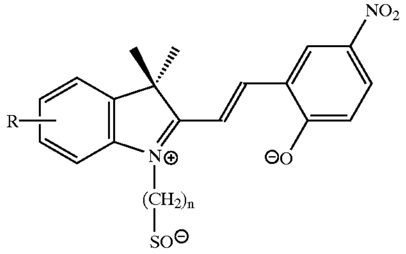

wherein n is an integer representing the number of repeat $-CH_2-$ units and R is $-H$ or $-CH{=}CH_2$, wherein said particles are prepared by an emulsion aggregation process.

2. An addressable display according to claim 1 wherein the spiropyran material is of the formula

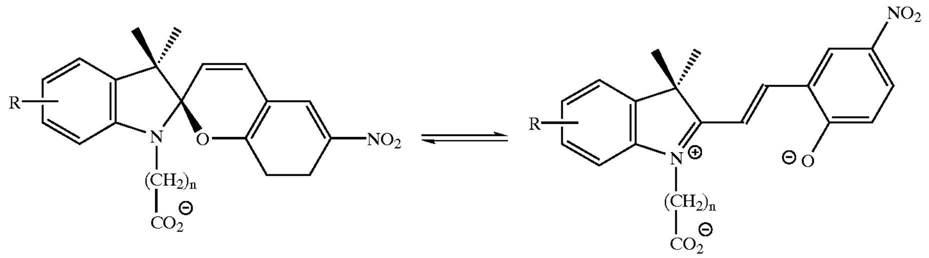

wherein n is an integer of from about 2 to about 8.

3. An addressable display according to claim 1 wherein the spiropyran material is of the formula

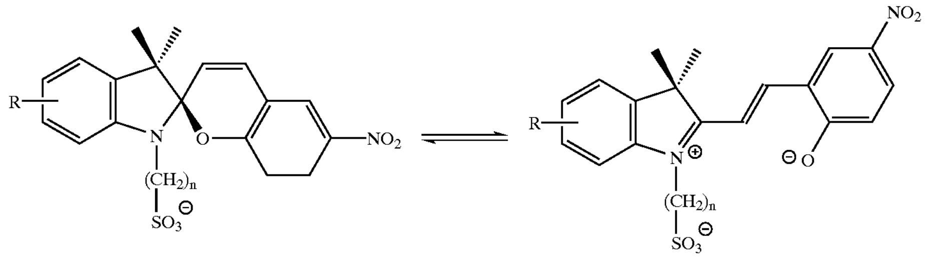

wherein n is an integer of from about 2 to about 8.

4. An addressable display according to claim 1 wherein the spiropyran material is of the formula

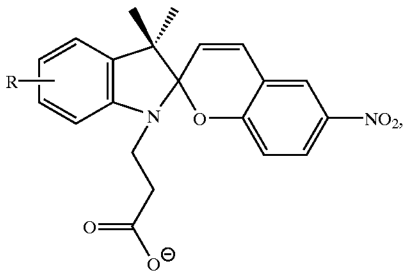

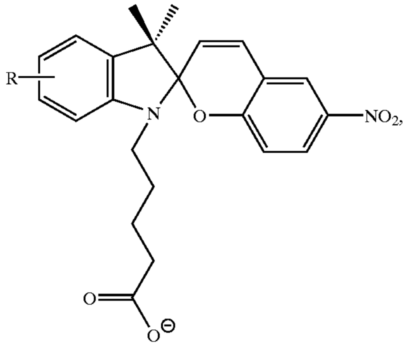

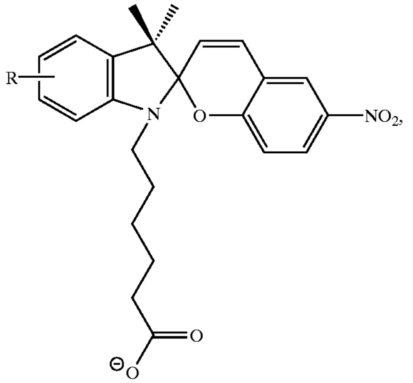

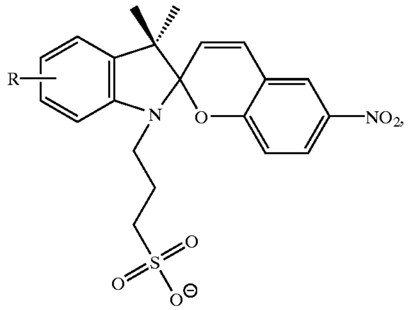

or

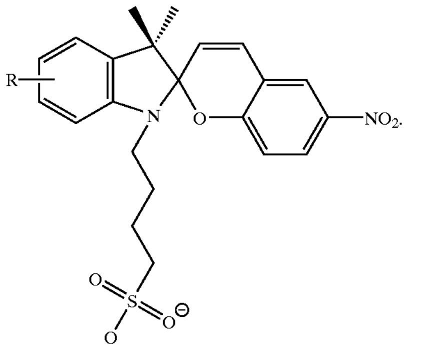

5. An addressable display according to claim 1 wherein the spiropyran material is present in the marking particles in an amount of at least about 0.0 percent by weight of the marking particles.

6. An addressable display according to claim 1 wherein the spiropyran material is present in the marking particles in an amount of at least about 0.05 percent by weight of the marking particles, and wherein the spiropyran material is present in the marking particles in an amount of no more than about 5 percent by weight of the marking particles.

7. An addressable display according to claim 1 wherein the chelating agent is a metal salt in the 2 state.

8. An addressable display according to claim 1 wherein the chelating agent is a salt of calcium, magnesium, zinc, or a transition metal.

9. An addressable display according to claim 1 wherein the chelating agent is present in the marking particles in an amount relative to the spiropyran material of at least about 1 mole of chelating agent for every 1 mole of spiropyran material.

10. An addressable display according to claim 1 wherein the chelating agent is present in the marking particles in an amount relative to the spiropyran material of at least about 2 moles of chelating agent for every 1 mole of spiropyran material, and wherein the chelating agent is present in the marking particles in an amount relative to the spiropyran material of no more than about 10 moles of chelating agent for every 1 mole of spiropyran material.

11. An addressable display according to claim 1 wherein the resin is selected from poly(styrene/butadiene), poly(p-methyl styrene/butadiene), poly(m-methyl styrene/butadiene), poly(α-methyl styrene/butadiene), poly(methyl methacrylate/butadiene), poly(ethyl methacrylate/butadiene), poly(propyl methacrylate/butadiene), poly(butyl methacrylate/butadiene), poly(methyl acrylate/butadiene), poly(ethyl acrylate/butadiene), poly(propyl acrylate/butadiene), poly(butyl acrylate/butadiene), poly(styrene/isoprene), poly(p-methyl styrene/isoprene), poly(m-methyl styrene/isoprene), poly(α-methyl styrene/isoprene), poly(methyl methacrylate/isoprene), poly(ethyl methacrylate/isoprene), poly(propyl methacrylate/isoprene), poly(butyl methacrylate/isoprene), poly(methyl acrylate/isoprene), poly(ethyl acrylate/isoprene), poly(propyl acrylate/isoprene), poly(butylacrylate-isoprene), poly(styrene/n-butyl acrylate/acrylic acid), poly(styrene/n-butyl methacrylate/acrylic acid), poly(styrene/n-butyl methacrylate/β-carboxyethyl acrylate), poly(styrene/n-butyl acrylate/β-carboxyethyl acrylate), poly(styrene/butadiene/methacrylic acid), polyethylene terephthalate, polypropylene terephthalate, polybutylene terephthalate, polypentylene terephthalate, polyhexalene terephthalate, polyheptadene terephthalate, polyoctalene-terephthalate, sulfonated polyesters, and mixtures thereof.

12. An addressable display according to claim 1 wherein the marking particles further comprise a charge control agent.

13. An addressable display according to claim 1 wherein the marking particles further comprise a colorant.

14. An addressable display according to claim 1 wherein the emulsion aggregation process comprises (a) preparing a latex emulsion comprising particles of the resin, (b) combining the latex emulsion with the chelating agent and the spiropyran, (c) heating the latex emulsion containing the resin, the spiropyran, and the chelating agent to a temperature below the glass transition temperature of the resin, and (d) after heating the latex emulsion containing the resin, the spiropyran, and the chelating agent to a temperature below the glass transition temperature of the resin, heating the latex emulsion containing the resin, the spiropyran, and the chelating agent to a temperature above the glass transition temperature of the resin.

15. An addressable display according to claim 1 wherein the emulsion aggregation process comprises (a) preparing a dispersion of the spiropyran and the chelating agent in a solvent, (b) admixing the spiropyran dispersion with a latex emulsion comprising particles of the resin and an optional flocculating agent, thereby causing flocculation or heterocoagulation of formed particles of the spiropyran, the chelating agent, and the resin to form electrostatically bound aggregates, (c) heating the electrostatically bound aggregates at a temperature below the glass transition temperature of the resin to form stable aggregates, and (d) heating the stable aggregates at a temperature above the glass transition temperature of the resin to coalesce the stable aggregates into marking particles.

16. An addressable display according to claim 1 wherein the emulsion aggregation process comprises (1) preparing a dispersion of the spiropyran in a solvent, which dispersion comprises the spiropyran, the chelating agent, an ionic surfactant, and an optional charge control agent; (2) shearing the spiropyran dispersion with a latex emulsion comprising (a) a surfactant which is either (i) counterionic, with a charge polarity of opposite sign to that of said ionic surfactant, or (ii) nonionic, and (b) particles of the resin, thereby causing flocculation or heterocoagulation of formed particles of the spiropyran, the chelating agent, the resin, and the optional charge control agent to form electrostatically bound aggregates, (3) heating the electrostatically bound aggregates at a temperature below the glass transition temperature of the resin to form stable aggregates, and (4) adding an additional amount of the ionic surfactant to the aggregates and heating the aggregates to a temperature above the resin glass transition temperature to provide coalesced marking particles.

17. An addressable display according to claim 1 wherein the emulsion aggregation process comprises (1) preparing a dispersion of the spiropyran in a solvent, which dispersion comprises the spiropyran, the chelating agent, and an ionic surfactant; (2) shearing the spiropyran dispersion with a latex mixture comprising (a) a flocculating agent, (b) a nonionic surfactant, and (c) the resin, thereby causing flocculation or heterocoagulation of formed particles of the spiropyran, the flocculating agent, and the resin to form electrostatically bound aggregates; and (3) heating the electrostatically bound aggregates to form stable aggregates.

18. An addressable display according to claim 1 wherein the spiropyran material is incorporated into the backbone of the resin.

19. An addressable display according to claim 18 wherein the emulsion aggregation process comprises (a) preparing a latex emulsion comprising particles of the resin, said resin comprising a polymer which comprises at least two different monomers, one of said monomers being the spiropyran, (b) combining the latex emulsion with the chelating agent, (c) heating the latex emulsion containing the resin and the chelating agent to a temperature below the glass transition temperature of the resin, and (d) after heating the latex emulsion containing the resin and the chelating agent to a temperature below the glass transition temperature of the resin, heating the latex emulsion containing the resin and the chelating agent to a temperature above the glass transition temperature of the resin.

20. An addressable display according to claim 18 wherein the emulsion aggregation process comprises (a) preparing a dispersion of the chelating agent in a solvent, (b) admixing the dispersion with a latex emulsion comprising particles of the resin and an optional flocculating agent, said resin comprising a polymer which comprises at least two different monomers, one of said monomers being the spiropyran, thereby causing flocculation or heterocoagulation of formed particles of the chelating agent and the resin to form electrostatically bound aggregates, (c) heating the electrostatically bound aggregates at a temperature below the glass transition temperature of the resin to form stable aggregates, and (d) heating the stable aggregates at a temperature above the glass transition temperature of the resin to coalesce the stable aggregates into marking particles.

21. An addressable display according to claim 18 wherein the emulsion aggregation process comprises (1) preparing a dispersion in a solvent, which dispersion comprises the chelating agent, an ionic surfactant, and an optional charge control agent; (2) shearing the dispersion with a latex emulsion comprising (a) a surfactant which is either (i) counterionic, with a charge polarity of opposite sign to that of said ionic surfactant, or (ii) nonionic, and (b) particles of the resin, said resin comprising a polymer which comprises at least two different monomers, one of said monomers being the spiropyran, thereby causing flocculation or heterocoagulation of formed particles of the chelating agent, the resin, and the optional charge control agent to form electrostatically bound aggregates, (3) heating the electrostatically bound aggregates at a temperature below the glass transition temperature of the resin to form stable aggregates, and (4) adding an additional amount of the ionic surfactant to the aggregates and heating the aggregates to a temperature above the resin glass transition temperature to provide coalesced marking particles comprising the resin, the chelating agent, and the optional charge control agent.

22. An addressable display according to claim 18 wherein the emulsion aggregation process comprises (1) preparing a dispersion of the chelating agent in a solvent, which dispersion comprises the chelating agent and an ionic surfactant; (2) shearing the dispersion with a latex mixture comprising (a) a flocculating agent, (b) a nonionic surfactant, and (c) the resin, said resin comprising a polymer which comprises at least two different monomers, one of said monomers being the spiropyran, thereby causing flocculation or heterocoagulation of formed particles of the flocculating agent and the resin to form electrostatically bound aggregates; and (3) heating the electrostatically bound aggregates to form stable aggregates.

23. An addressable display according to claim 1 wherein the particles have an average particle diameter of at least about 1 micron, and wherein the particles have an average particle diameter of no more than about 25 microns.

24. An addressable display according to claim 1 wherein the particles have an average particle diameter of at least about 2 microns, and wherein the particles have an average particle diameter of no more than about 10 microns.

25. A process which comprises (a) providing an addressable display according to claim 1, and (b) effecting a photochromic change in at least some of the marking particles from a first state corresponding to a first absorption spectrum to a second state corresponding to a second absorption spectrum, thereby generating a visible image on the addressable display.

26. A process according to claim 25 further comprising the step of causing the marking particles in the second state to undergo another photochromic change, thereby returning them to the first state and erasing the visible image.

* * * * *